United States Patent [19]

Washburn

[11] Patent Number: 5,156,230
[45] Date of Patent: Oct. 20, 1992

[54] BELOW GROUND MINING VEHICLE AND METHOD FOR CONVERTING AN ABOVE GROUND VEHICLE TO THE SAME

[75] Inventor: David J. Washburn, Orem, Utah

[73] Assignee: General Manufacturing of Utah, Inc., Orem, Utah

[21] Appl. No.: 631,651

[22] Filed: Dec. 19, 1990

Related U.S. Application Data

[63] Continuation-in-part of Ser. No. 448,807, Dec. 11, 1989, Pat. No. 5,033,567.

[51] Int. Cl.$^5$ .............................................. B60K 31/00
[52] U.S. Cl. ................................... 180/170; 100/271; 100/337
[58] Field of Search ............... 180/170, 271, 287, 337, 180/89.12, 89.1; 280/781, 785, 790; 296/183, 193, 194, 195, 196, 197

[56] References Cited

U.S. PATENT DOCUMENTS

| | | | |
|---|---|---|---|
| 2,897,004 | 7/1959 | Skeens | 298/25 |
| 3,675,966 | 7/1972 | Luft | 296/28 C |
| 3,680,653 | 8/1972 | Murata et al. | 280/89.1 |
| 3,698,759 | 10/1972 | Luft | 296/35 R |
| 3,885,643 | 5/1975 | Goodbary | 180/89 R |
| 4,078,629 | 3/1978 | Kutay et al. | 180/89.13 |
| 4,090,736 | 5/1978 | Finney | 299/30 |
| 4,157,878 | 6/1979 | Jamison | 405/303 |
| 4,415,051 | 11/1983 | Taylor | 180/65 R |

OTHER PUBLICATIONS

J. C. Whitney Catalog No. 5275, Feb. 1991, p. 197.
J. C. Whitney Catalog No. 506 J, May 1989 pp. 128, 134, 137, 170, 193 and 234.
Marketing Brochure for the EIMCO 955 Minetender Carrier, Eimco Mining Machinery International.
Marketing Brochure for A. L. Lee Corp. Model 1112-4D Personnel Transporter.
Marketing Brochure of Getman Corp. A64 Series Personnel Carrier.
Potential Public Use by Mountain Pacific Transport of Pleasant Grove, Utah (as evidenced by photographs 1–6).

Primary Examiner—Kenneth R. Rice
Attorney, Agent, or Firm—Thorpe, North & Western

[57] ABSTRACT

A below ground mining vehicle, and a method for converting an above ground vehicles into the same, which is particularly adapted for transporting workers and/or light equipment. An above ground vehicle, such as a sport utility vehicle, is modified and components are added thereto in accordance with the present invention, to arrive at the below ground mining vehicle. The vehicle includes: a speed limited engine; a transmission having its upper forward speeds disabled; fire suppression means in the vicinity of the engine; a manual fuel shut off valve in the fuel line; an engine intake air shut off valve which closes in response to a temperature sensor detecting an abnormal engine temperature; a battery box enclosing a battery; a circuit breaker serially connected with the battery; fire suppression means in the vicinity of the fuel tank; a fire suppression means in the vicinity of the exhaust muffler; and a back up alarm. The described below ground mining vehicle provides many features and better performance than previously available in below ground mining vehicles and achieves such performance and features more economically than possible with prior art vehicles.

35 Claims, 22 Drawing Sheets

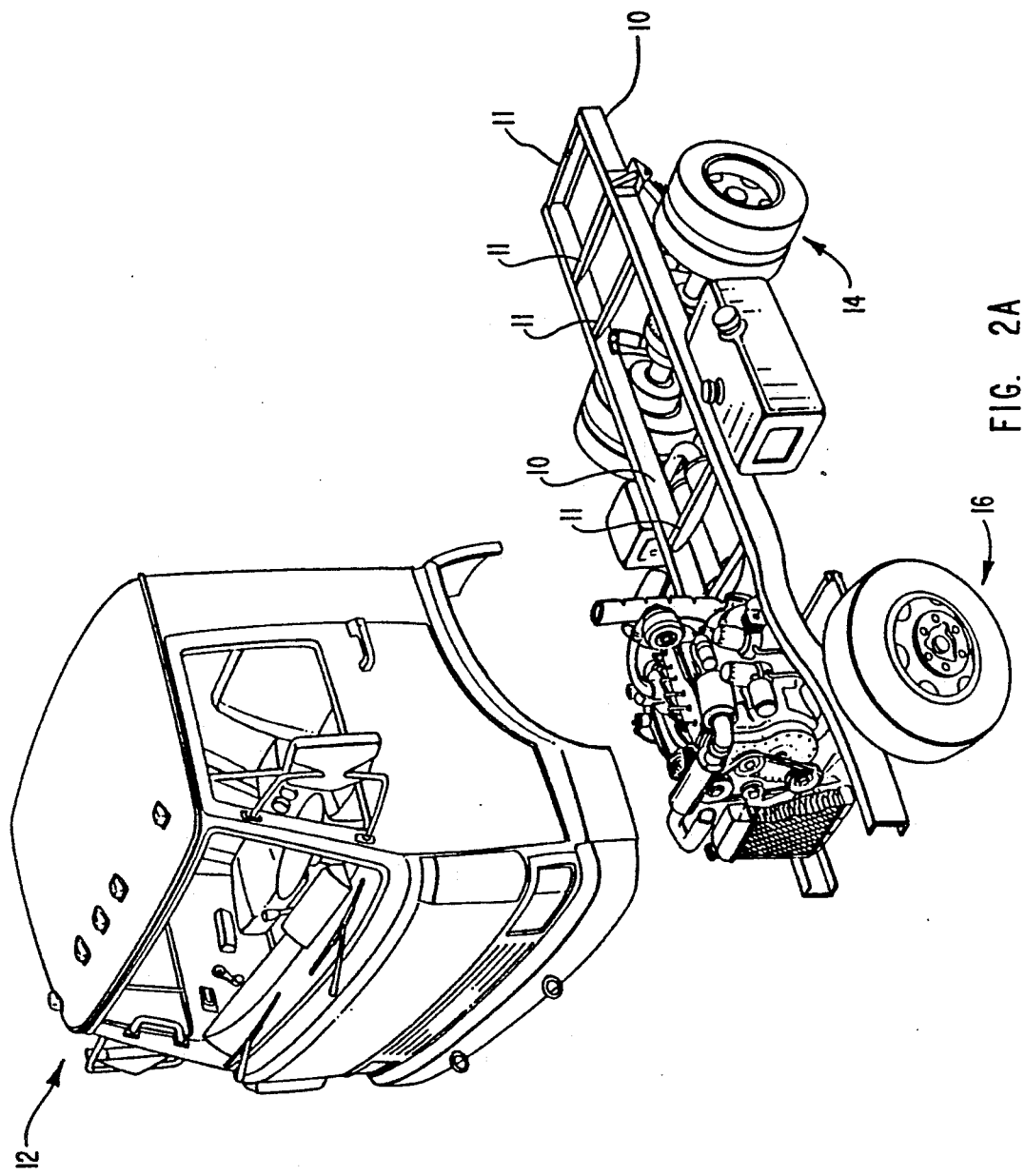

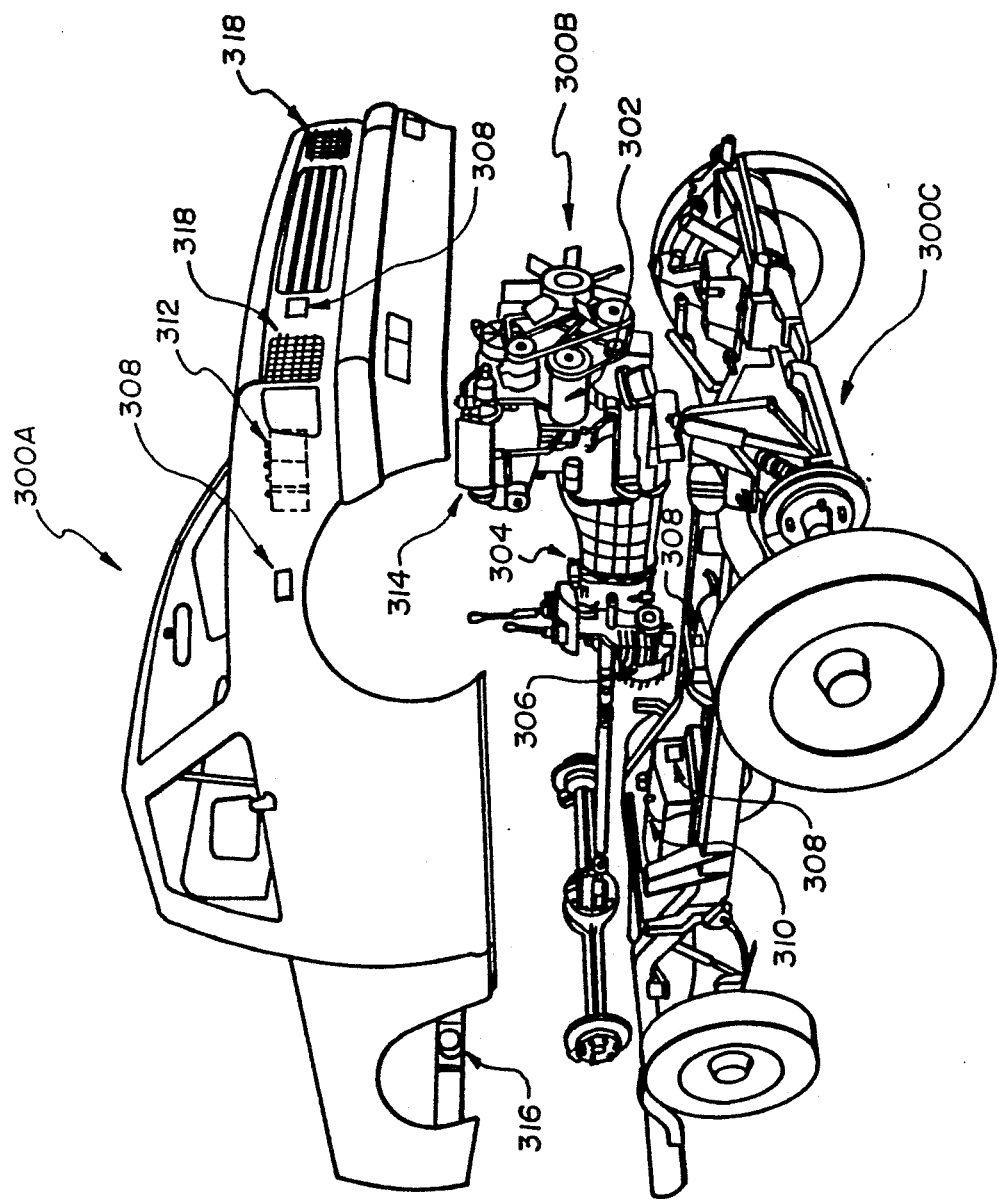

BELOW GROUND MINING VEHICLE AND METHOD FOR CONVERTING AN ABOVE GROUND VEHICLE TO THE SAME

RELATED APPLICATIONS

This application is a continuation-in-part of U.S. patent application Ser. No. 07/448,807 filed Dec. 11, 1989, for Low Profile Self Propelled Vehicle and Method for Converting a Normal Profile Vehicle to the Same naming David J. Washburn and Glen L. Enke as inventors.

BACKGROUND

1. The Field of the Invention

This invention relates to below ground vehicles used to transport equipment and personnel in below ground mining operations. More particularly, the present invention relates to methods for converting an above ground utility vehicle to a below ground utility vehicle and the resulting vehicles.

2. The Prior Art

Modern mining operations have a need for general purpose below ground vehicles. In the mining industry, vehicles are required to maneuver in low clearance mine roadways to transport personnel, maintenance equipment, fuel and lubricates, and other items from one location to another in the mining operation.

Below ground vehicles used in mining operations must have a maximum vertical height of eighty, and usually less than about sixty, inches and must be particularly suited to operation in the often hazardous and inhospitable mine environment. The vertical height of a below ground vehicle is generally measured from the underlying road or ground surface to the highest rigid structure on the vehicle.

While some mining vehicles must be able to carry payloads of anywhere in the range from hundreds to thousands of pounds reliably over rough road conditions, it is often necessary to transport only small items or a single mine worker. Above ground vehicles, which are intended for use on city streets and highways, are generally not appropriate for below ground mining use. Thus, it is widely recognized among those having skill in the art that above ground vehicles do not have application in the below ground mining industry.

The general recognition in the mining industry that even general purpose below ground vehicles must meet minimum safety standards and must include certain features has caused some manufacturers to produce specialized below ground vehicles. Generally, below ground mining vehicles must include features and structures which would be unsuitable for above ground vehicles for street and highway use. It is the usual case that specific below ground vehicles are custom built for the mining industry, e.g., vehicles are designed and built individually, or in quantities only in the tens, specifically for the mining industry. This is in contrast to the tens of thousands, or hundreds of thousands, of a particular chassis of a normal profile vehicle which will customarily be produced by a manufacturer.

Manufacturers of specialized below ground mining vehicles include: Eimco Mining Machinery International of Canada; A. L. Lee Corp. of Lester, W. Va.; and Getman Corporation of Bangor, Mich.

The market for such specifically designed and custom built below ground mining vehicles is very limited with some manufacturers producing only a few of each model each year. Thus, each below ground mining vehicle is generally built on an individual basis, or in very few numbers, to fill the need of a particular customer or class of customers.

It is widely acknowledged that producing such small numbers of specifically designed below ground mining vehicles is inherently inefficient. Thus, the cost of each vehicle is very high compared to vehicles which are mass produced and directed to a larger number of users.

Moreover, since so few below ground mining vehicles are built by each manufacturer, the design and fabrication of the vehicles requires that simple and readily available components, materials, and fabrication techniques be used. For example, in mass produced vehicles where tens of thousands are manufactured, such as above ground sport utility vehicles and small trucks, the frame, engine, drive train components, and body parts are all specifically designed and extensively tested to ensure that they work together properly and in a trouble free manner.

In contrast, prior art below ground mining vehicles are designed by each manufacturer and built in small numbers from the "ground up" with no other perspective in mind but to produce the vehicle for the intended specific end use. Thus, below ground mining vehicle manufacturers are left to obtain components such as engines, drive trains, and brake systems from sources where they are mass produced. The remaining components used in low profile vehicles such as frames and body parts, must be individually fabricated by the vehicle manufacturer.

As recognized in the arts devoted to design and production of vehicles for street and highway use, the compatibility of vehicle components is crucial to making a vehicle perform most efficiently. Ensuring that vehicle components are compatible requires a great deal of design, engineering, and testing effort before production of the vehicle begins. Such extensive design, engineering, and testing efforts are prohibitively expensive in view of the small numbers of below ground mining vehicles which are manufactured. Unfortunately, the use of "high quality" individual components does not ensure that the components will work well together.

Since the frames, bodies, and other components of prior art below ground mining vehicles must be designed and fabricated in small numbers, they are of simple construction and are fitted with components which are not ideally suited for use therewith. In the case of body parts, large flat pieces of sheet metal are generally attached to a simple geometric framework giving the completed below ground mining vehicle a "boxy" and "unfinished" appearance when compared to mass produced vehicles which are manufactured for street and highway use.

Moreover, the fact that each prior art below ground mining vehicle is individually designed and built causes most manufacturers to omit the design, fabrication and installation of many desirable features into their vehicles. Such omitted features may include performance enhancing features such as drive train, exhaust system, and suspension, braking, and fuel system improvements.

Also omitted from some prior art below ground mining vehicles are even basic amenities for the comfort and safety of the low profile vehicle operator such as cab environmental control, roll down windows, padded dashboard, windshield wipers, and windshield washers. In some cases, below ground mining vehicles do not provide the operator with any enclosed cab at all.

In view of the foregoing, it would be an advance in the art to provide a below ground mining vehicle which includes the desirable features present in above ground vehicles which are equipped for street and highway use while providing the below ground mining vehicle at a lower cost than prior art low profile vehicles. It would be a further advance in the art to provide a method of converting above ground vehicles for use as below ground mining vehicles. It would also be an advance in the art to provide a below ground vehicle conversion which allows below ground vehicles to be produced more efficiently than are prior art below ground vehicles which are designed and built in small numbers for specific end uses.

BRIEF SUMMARY AND OBJECTS OF THE INVENTION

In view of the above described state of the art, the present invention seeks to realize the following objects and advantages.

It is a primary object of the present invention to provide a method for converting an above ground vehicle into a below ground vehicle.

It is another object of the present invention to provide a method for converting an above ground vehicle into a below ground mining vehicle which may be carried out more efficiently and more economically than fabricating a below ground mining vehicle in accordance with the teachings of the prior art.

It is another object of the present invention to provide a method of converting an above ground vehicle into a below ground mining vehicle which retains the desirable features of the above vehicle.

These and other objects of the present invention will become more fully apparent during an examination of this disclosure and by practicing the invention.

These and other objects and advantages of the invention will become more fully apparent from the description and claims which follow, or may be learned by the practice of the invention.

The present invention provides an efficient below ground mining vehicle and a method of converting an above ground vehicle to the same. Important to the method is reducing the maximum speed attainable by the below ground mining vehicle to some acceptably low value for below ground mining operations, e.g., about 25-35 miles per hour. In order to convert the above ground vehicle, a portion of the drive train between the diesel engine and the rear wheels is disconnected and the drive train is modified, either by inserting additional components or preferably altering existing components, so that the maximum speed attainable by the vehicle is no greater than one third of the original maximum vehicle speed. The drive train is then reconnected between the engine and the rear wheels.

One preferred method of carrying out the present invention on an original above ground vehicle includes the steps of modifying the diesel engine to limit engine speed to not greater than 90% of the original maximum engine speed and modifying the transmission so that at least one of the highest forward speeds is disabled.

The novel below ground mining vehicle of the present invention preferably includes a chassis, a body mounted on the chassis, the body including an operator's compartment, an engine, the engine including means for limiting the maximum engine speed to not greater than about 3500 r.p.m., a first pair of wheels, the first pair of wheels used for steering the vehicle, a second pair of wheels, the second pair of wheels being always driven by the engine and a transmission, the transmission comprising a highest forward speed which propels the below ground mining vehicle at no more than about 25 miles per hour when the engine is operating at its maximum speed.

Preferred embodiments of the present invention can also include a diesel engine having a fuel injection pump, the fuel injection pump including a governor which is limited to about 3500 r.p.m. to limit engine speed. It is also preferred that the transmission included in the embodiment be the transmission which arrived with the original vehicle but which has had the highest one, two, or three forward speeds disabled so that the maximum vehicle speed is limited. If the original vehicle is provided with a four wheel drive transfer case, it is preferred that the transfer case be modified so that the transfer case is permanently set in the four wheel drive, low range, position.

The embodiments of the present invention also preferably include safety equipment such as: fire suppression means in the vicinity of the engine; a manual fuel shut off valve; an engine intake shut off valve and a temperature sensor positioned adjacent to the engine, the engine intake shut off valve closing in response to the temperature sensor detecting an abnormal temperature.

Also included in the preferred embodiment of the invention are: a battery box enclosing a battery; a circuit breaker serially connected with the positive terminal of the battery; fire suppression means in the vicinity of the fuel tank; an exhaust muffler; a fire suppression means in the vicinity of the exhaust muffler and a back up alarm.

BRIEF DESCRIPTION OF THE DRAWINGS

In order that the manner in which the above-recited and other advantages and objects of the invention are obtained can be appreciated, a more particular description of the invention briefly described above will be rendered by reference to specific embodiments thereof which is illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2A is a perspective view of the cab assembly of the normal profile vehicle chassis illustrating the step of removing the cab from the frame in accordance with the present invention.

FIG. 12 is an exploded perspective view of another presently preferred embodiment of the present invention which is particularly adapted for use as a general purpose below ground mining vehicle.

DETAILED DESCRIPTION OF THE PREFERRED EMBODIMENTS

Reference will now be made to the drawings wherein like structures will be provided with like reference designations. A general overview of the first presently preferred embodiment of the present invention will first be provided followed by a detailed listing of the presently preferred steps used to fabricate the first presently preferred embodiment of the present invention. A detailed description of the steps carried out to fabricate a second presently preferred embodiment of the present invention will then be provided. Generally, the first described embodiment is adapted for use as a large capacity low profile vehicle which may be adapted to any one of a variety of end uses. The second described embodiment is particularly intended for use as a generally purpose, or light utility, below ground mining vehicle.

1. General Overview of the Method and Structure of the First Described Embodiment There are instances in various industries where efficient operations within the industry requires a vehicle which can maneuver under low clearances. In this disclosure a low profile vehicle will first be described which is intended for use in mining operations. The present invention, and also the first particular embodiment described herein, has applications and uses other than in mining operations.

Figure 1:
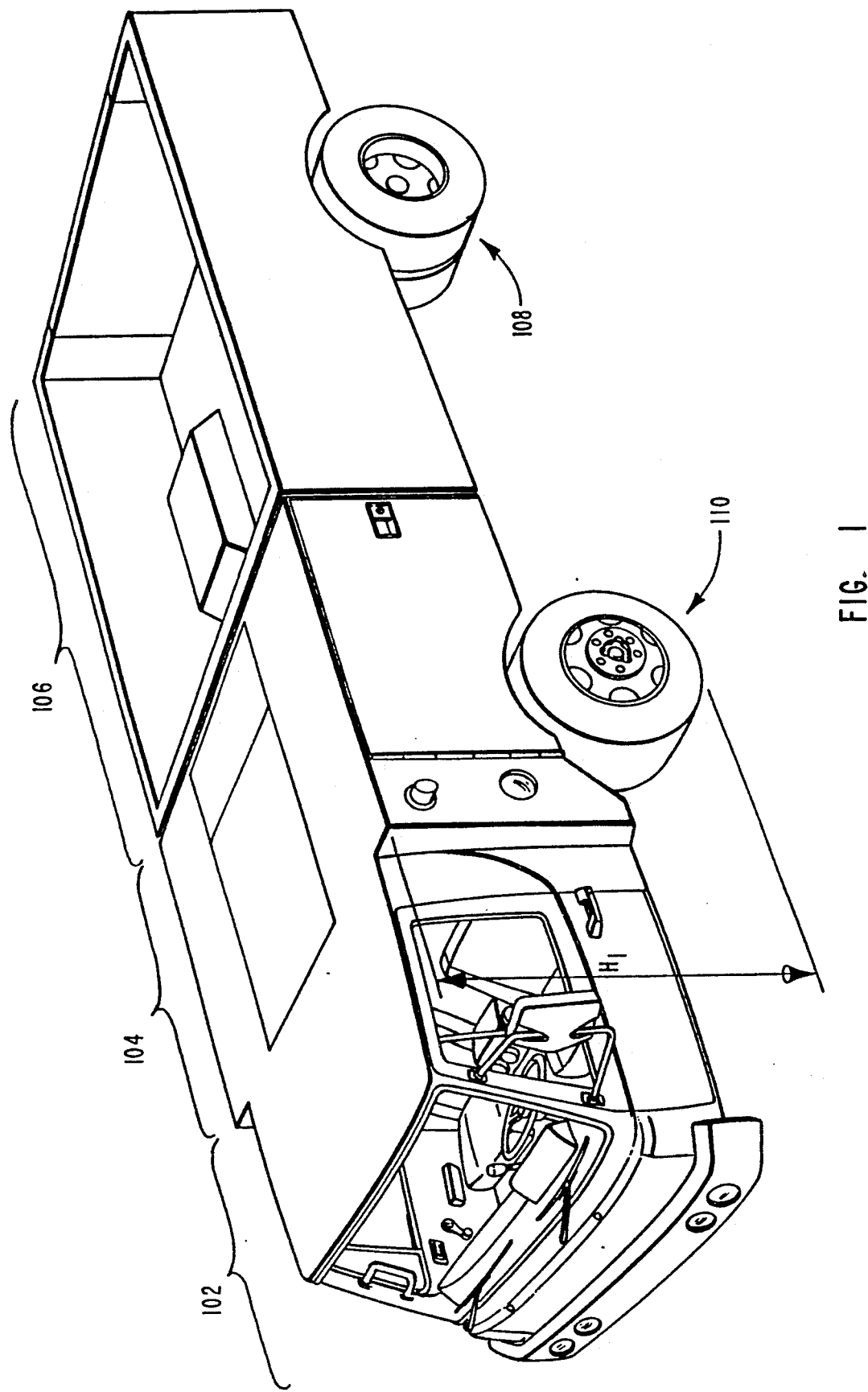
FIG. 1 is a perspective view of a completed low profile vehicle which was converted from a normal profile vehicle in accordance with the present invention.

FIG. 1 provides a perspective view of one presently preferred embodiment of the present invention resulting from the conversion of a large capacity normal profile vehicle chassis which was mass produced for use on city streets and highways. It will be appreciated that a low profile vehicle used in mining operations must be able to maneuver in low clearances, for example, less than fifty-five inches. Normal profile vehicles intended for city and highway use place the operator's cab as high as practically possible, for example eighty to one-hundred and twenty-five inches vertical height, in order to maximize the visibility of the operator.

The embodiment of the present invention is specifically intended to be used as a two man general utility low profile truck in mining operations which will maneuver on low clearance mining roadways. In general, a low profile vehicle is defined as a vehicle having a maximum height of less than eighty inches.

The clearances available from one below ground mining operation to another varies considerably. In one mine clearances of one-hundred inches or more may be available. In another mine, the clearance may only be fifty-five inches or less. In many cases, reducing the maximum height of a low profile vehicle by merely several inches is important.

The preferred maximum height of the first described embodiment is fifty-five inches, as represented in FIG. 1 at $H_1$, but higher or lower maximum heights may be utilized according to the teachings of the present invention and the requirements of the particular application. A maximum height of fifty-five inches allows the low profile vehicle to maneuver in the great majority of below ground mining operations and in aircraft support applications.

The embodiment of the present invention illustrated in FIG. 1 includes a cab assembly, designated by bracket 102, an engine assembly, designated by bracket 104, and a body assembly, designated by bracket 106.

The body assembly represented in FIG. 1 is a general purpose truck bed which may be exchanged for other body assemblies adapted for other purposes as will be explained in detail later in this disclosure. Also illustrated in FIG. 1 is one of a pair of dual rear wheels, generally designated at 108, and one of a pair of front wheels, generally designated at 110, which are used to steer the vehicle.

The present invention's method of converting a normal profile vehicle to a low profile vehicle may be carried out on any number of mass produced normal profile vehicles which are commercially available. Such normal profile vehicles preferably include general purpose truck chassis (including engine, drive train, suspension, and wheels) or more specialized normal profile vehicles. It will also be appreciated that it is within the scope of the present invention to obtain the various chassis components as assemblies and then to produce a low profile vehicle within the scope of the present invention from the assemblies.

Figure 2:
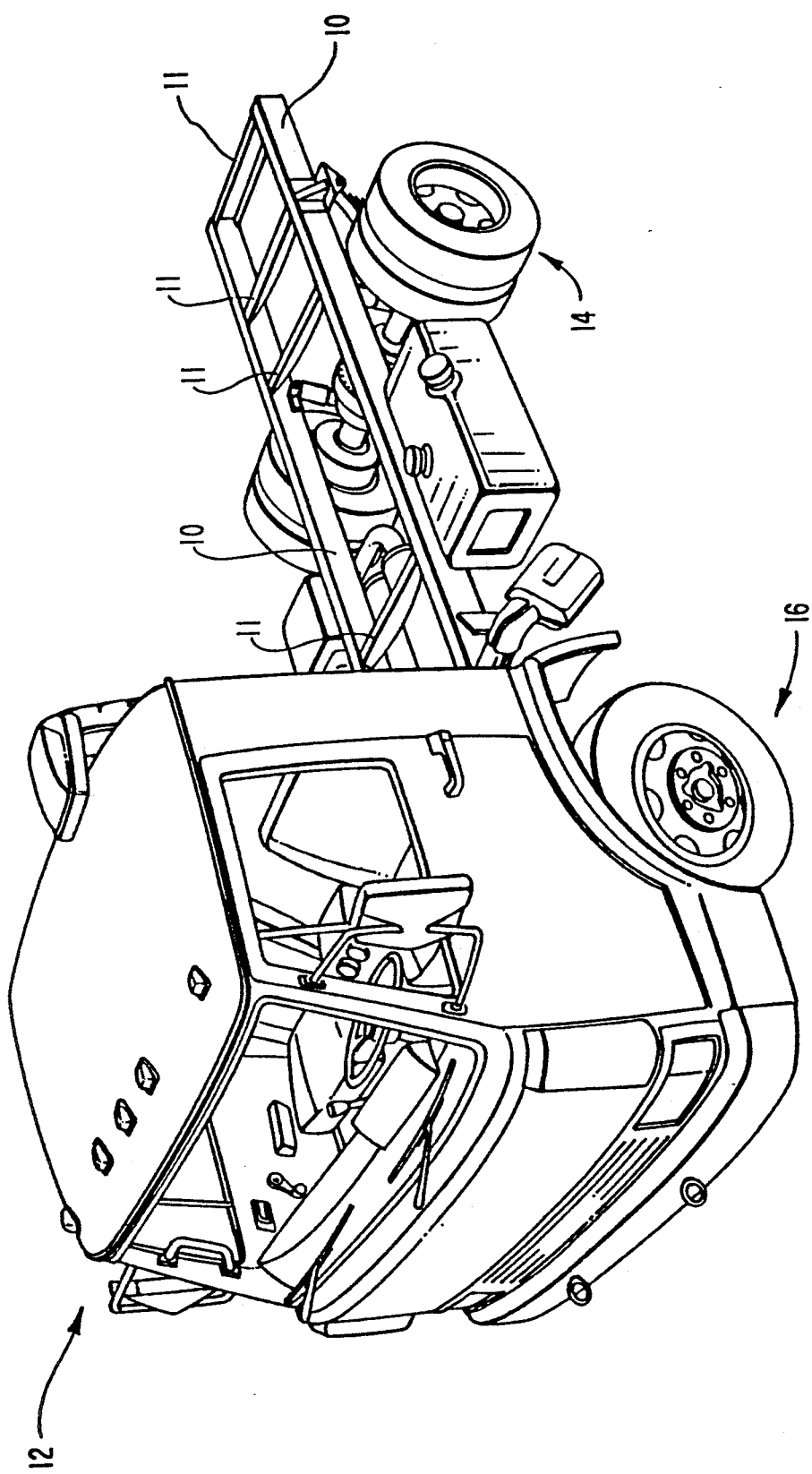
FIG. 2 is a perspective view of a normal profile vehicle chassis suitable for being converted to a low profile vehicle in accordance with the present invention.

Illustrated in FIG. 2 is a perspective view of a commercially available normal profile vehicle chassis which is presently preferred for use with the present invention. The illustrated chassis represents one of several available from Iveco Trucks of North America, Inc., 4 Sentry Parkway, Blue Bell, Pa. 19422.

The models preferred for use with the present invention which are available from Iveco Trucks of North America, Inc. are those beginning in the model year 1989 and identified by the following model numbers (including commencing serial numbers provided in parentheses): 12-11 (1110000); 12-12 (1150000); 10-14 (1210000); 12-14 (1250000); 15-14 (1310000); 18-14 (1350000); and 23-16 (1410000). Other normal profile vehicle chassis may also be used in accordance with the present invention. Further information concerning the identified models can be obtained from Iveco Trucks and from the version of the publication which is current as of December 1989 and entitled Iveco Diesel Truck Parts Manual (also referred to as Euro Spare Parts Catalog from Model Year 1989) which is incorporated herein by reference.

The vehicle chassis illustrated in FIG. 2 is well suited for carrying out the present invention. The ladder frame of the chassis includes two parallel rails 10 and a plurality of cross members 11. While the preferred vehicle chassis includes two rails as frame members, other chassis having other types of frames may be used.

Represented in FIG. 2, dual rear wheels 14 provide suitable traction for many applications and with the modifications of the present invention, as will be explained shortly, offer excellent performance in applications such as mining operations. Front wheels 16 are used to steer the vehicle.

The components and design of the preferred vehicle chassis provide an efficient low profile vehicle after undergoing the conversion of the present invention. As will be explained in more detail, the engine, suspension, brakes, and other components are, upon modification in accordance with the present invention, well suited to performing in a low profile vehicle and work together much better than the collection of components found in previous low profile vehicles. Moreover, the present invention allows features to be incorporated into a low profile vehicle which are unavailable in prior art low profile vehicles.

For example, a cab 12 is provided on the vehicle chassis illustrated in FIG. 2 which includes many operator safety and comfort features which are expected in normal profile vehicles. Such safety and comfort features are absent in prior art low profile vehicles and are considered, according to the conventional wisdom found in the art, as unavailable in low profile vehicles due to economic or other considerations. Such safety and comfort features included in the embodiment of the present invention will be specifically pointed out later in this disclosure.

Illustrated in FIG. 2A is the cab 12 of the vehicle chassis illustrated in FIG. 2 as it is being removed from the frame in accordance with the present invention. It will be appreciated that removal of the cab requires the disconnection of a variety of control lines, such as the steering wheel assembly, the accelerator cable, the clutch pedal assembly, the brake pedal assembly, the gear shift link rod, and other various components.

Those having skill in the art will appreciate the items which will require attention during the removal of the cab from the illustrated preferred vehicle chassis or from another vehicle chassis. Detailed information concerning the steps of removing the cab from the frame and the disconnection of control lines and other components from the preferred vehicle chassis will be provided later in this disclosure.

In accordance with the present invention, a split level frame means for supporting the other vehicle components thereon is provided. Represented in FIG. 3 are the components used to construct the presently preferred example of the split level frame means of the present invention.

Figure 3:
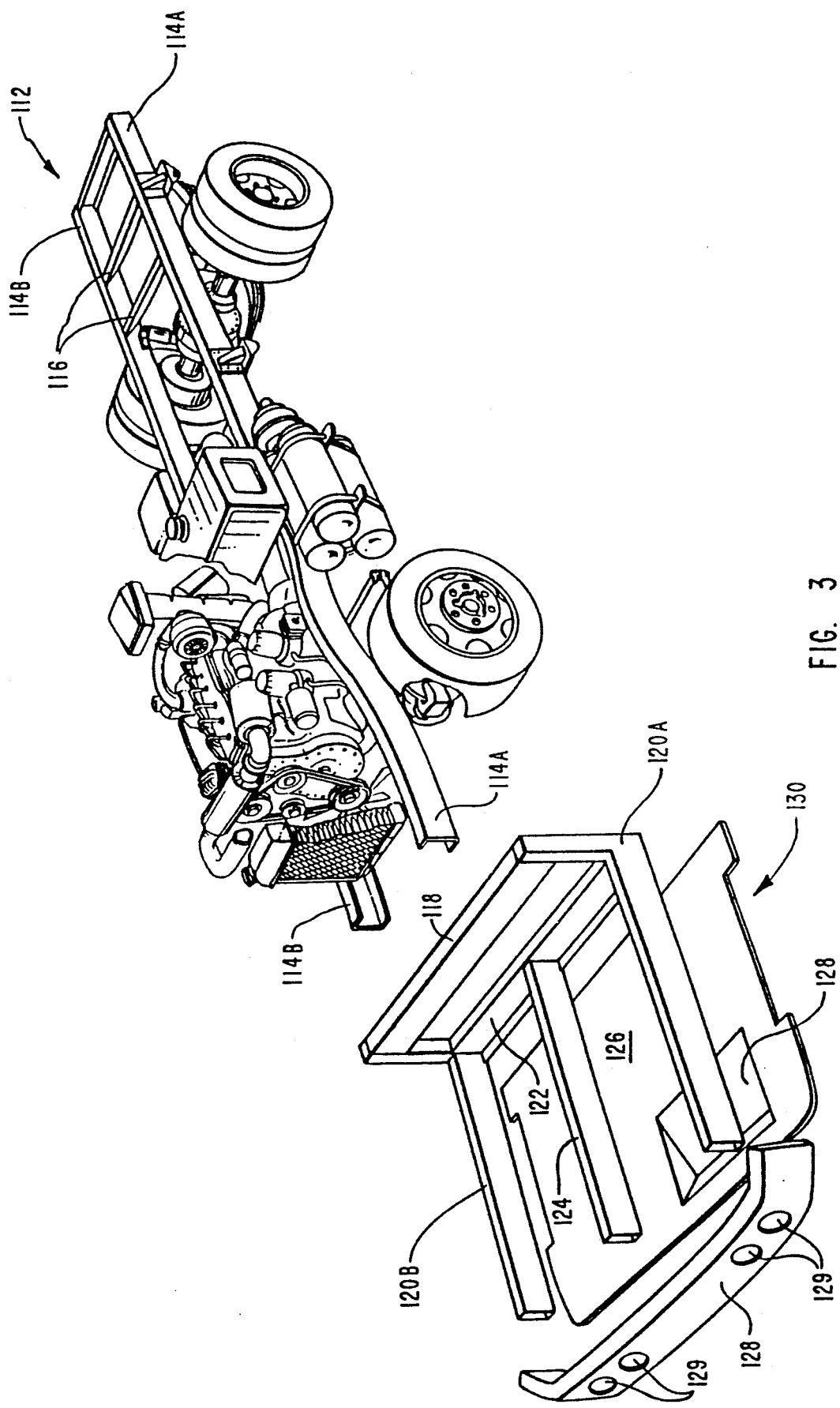
FIG. 3 is a perspective view showing a step of the present invention wherein a frame extension is attached to the frame of the normal profile vehicle.

Illustrated in FIG. 3 is a frame 112 (which before modification comprised rails 10 and cross members 11 as shown in FIG. 2) which includes parallel rails, now indicated at 114A and 114B, and a plurality of cross members indicated at 116. The ladder type frame illustrated in FIG. 3, which functions as a portion of the split level frame means of the present invention, is exemplary of the structures which may serve this function.

A frame extension, generally designated 130, is fabricated and attached to frame rails 114A and 114B to complete the presently preferred example of a split level frame. The incorporation of a split level frame allows the operator's cab (not shown in FIG. 3) to take full advantage of the height available between the maximum vertical height and the minimum ground clearance (the distance between the underlying surface and the vehicle components protruding below the level of the original frame). The use of the split level frame allows the cab to have the maximum possible height allowing for operator comfort and efficiency rather than the cramped operator's positions found in the prior art low profile vehicles.

The frame extension 130 comprises a torsion tube 118 which is attached to frame rails 114A and 114B. Two cantilever arms 120A and 120B are attached to torsion tube 118 so that their legs extend in a forward direction. A Z bar 122 is connected crossways between cantilever arms 120A and 120B and a tubular floor support 124 is connected thereto as illustrated in FIG. 3.

Frame extension 130 illustrated in FIG. 3 serves to support the cab which, after modification in accordance with the present invention, will be secured thereon. A floor plate 126 is attached to the bottom of the legs of cantilever arms 120A and 120B and to the bottom of tubular floor support 124 to form a floor.

A recess 128 is provided in floor plate 126 where accelerator, brake, and clutch operation pedals will be installed. To the forward end of frame extension 130 a bumper 128 is attached. Headlamp fixtures 129 are also provided in bumper 128.

The illustrated structure provides a strong frame extension which is lower than the remaining portion of the frame to accommodate the height of the cab to be placed thereon as will be explained shortly. From the teachings contained herein, those skilled in the pertinent art will readily understand what materials and techniques are suitable for use in the fabrication of frame extension 130.

Figure 3A:
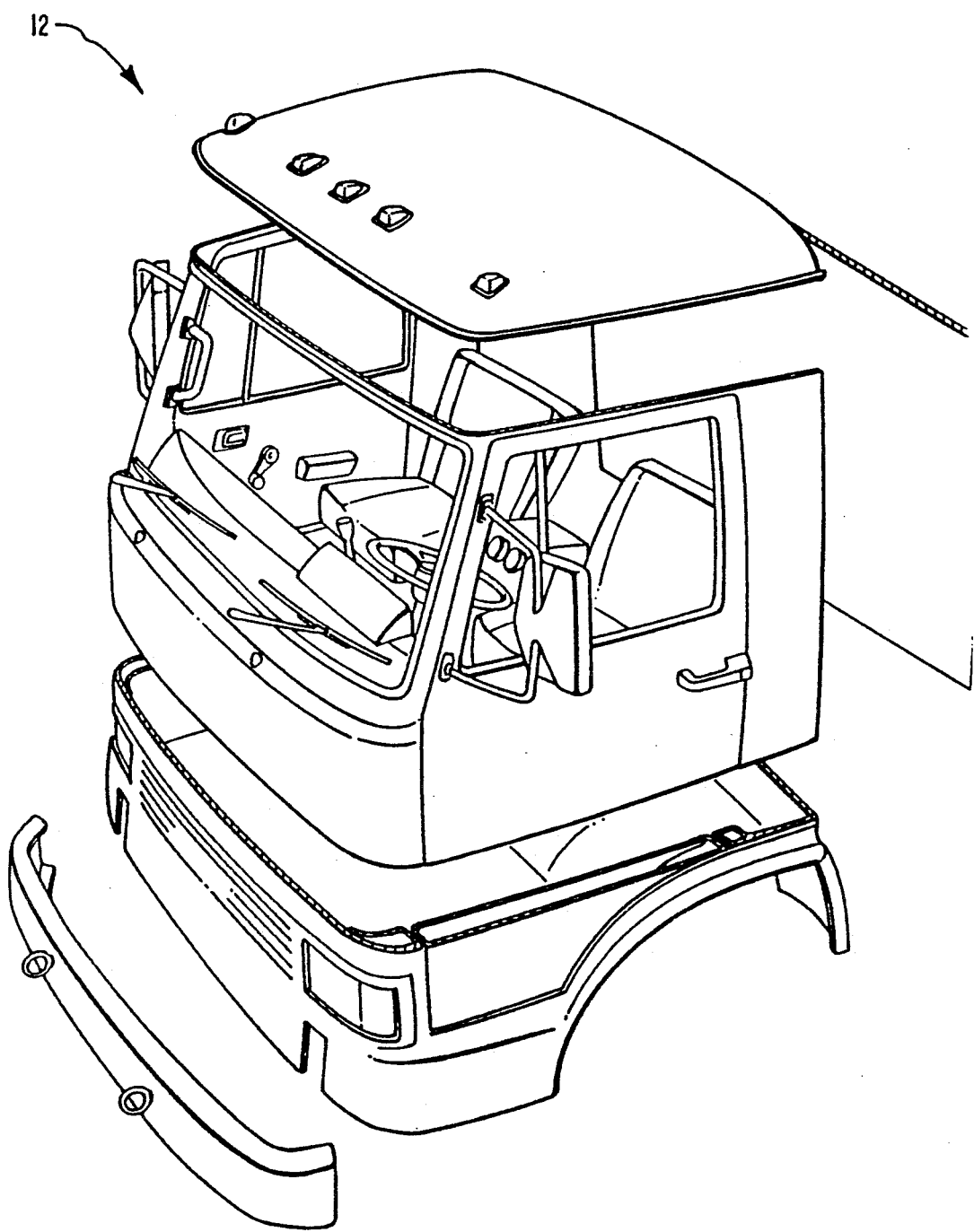
FIG. 3A is a perspective view of the cab assembly of the present invention undergoing the cut down step of the present invention.

Referring next to FIG. 3A, cab 12 the preferred vehicle chassis is illustrated undergoing the "cut down" step of the present invention. While other cabs may be treated differently than that specifically described herein, the described modification of the cab is presently preferred in this example.

As illustrated in FIG. 3A, the original cab is modified to form the primary component of the cab assembly (102 in FIG. 1) of the described embodiment. Importantly, the height of the cab is reduced while still retaining many of its advantageous features.

FIG. 3A shows the approximate cut lines used to shorten the cab. The cab roof is removed and a protective roof plate is installed on the completed cab assembly as shown at 202 in FIG. 4. The original roof is removed just above the drip gutter provided around the roof of the cab.

The side walls and front wall of the cab, as well as the entry doors, are reduced in height, and the back wall is removed, as shown in FIG. 3A. After examining the teachings contained herein, those skilled in the art will appreciate what other arrangements may be used to cut down a cab of a normal profile vehicle to accommodate particular applications and to fit other vehicle chassis.

Figure 4:
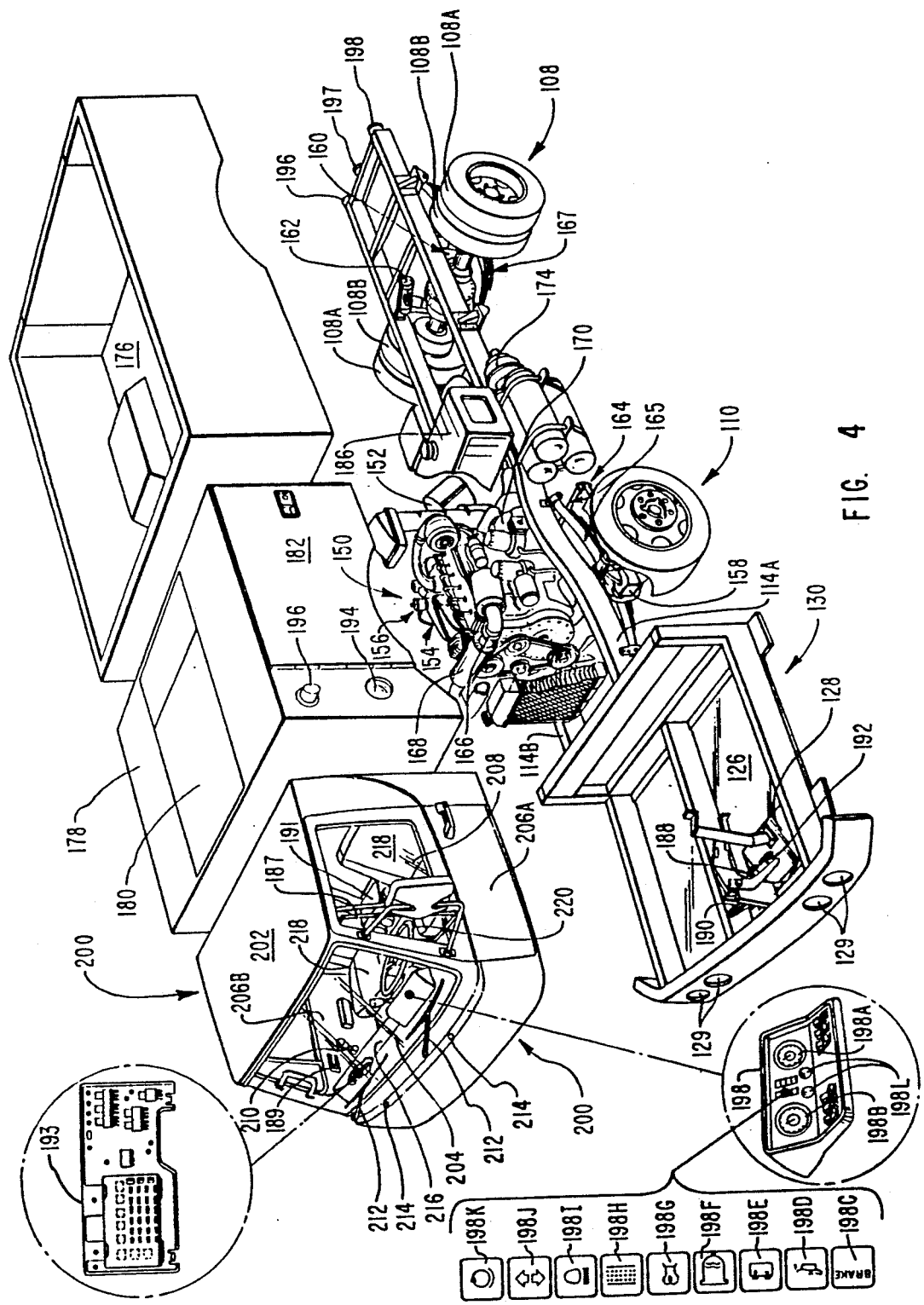
FIG. 4 is an exploded perspective view of the assemblies of the present invention which are to be installed on the low profile vehicle split level frame in accordance with the present invention.

Referring next to FIG. 4, the split level frame of the described embodiment is illustrated with frame extension 130 attached to frame rails 114A and 114B. The split level frame is much more economical to fabricate and less expensive and troublesome to maintain than articulating frames used in some prior art low profile vehicles. Frame extension 130 is ready to receive the modified cab shown suspended above the frame extension.

Floor plate 126 is shown attached to frame extension 130. Positioned within recess 128 formed on floor plate 130 are a clutch pedal 192, an accelerator pedal 190, and a brake pedal 188 which are each connected to their respective associated components by way of appropriate control lines as will be appreciated by those skilled in the art, and as will be explained later in this disclosure.

The embodiments of the present invention include an engine means for providing power to propel the vehicle. Illustrated in FIG. 4 is a diesel engine, generally designated at 150, and its associated components which is one presently preferred example of an engine means of the present invention. Diesel engine 150 is preferably the engine which is supplied with the preferred vehicle chassis.

Associated with engine 150 in the first presently preferred embodiment are additional components which enhance the performance of the vehicle and which are generally unavailable on prior art low profile vehicles. Represented in FIG. 4 at 154 are dual fuel filters each having a heater to improve cold weather performance. Also represented in FIG. 4 is an automatic glow plug, represented at 156, which assists with cold weather starting.

The illustrated embodiment is also provided with an air intake pre-cleaner chamber 152 which is adapted to eliminate large particles present in the intake air. The presently preferred embodiment is also equipped with an intake airflow warning system, as represented by indicator 198H, to alert the operator of the vehicle of restricted air intake flow. It will be recognized that when operating the low profile vehicle in a mining operation the risk of particulate entering the engine or restricting the air flow therein is significant. Thus, the inclusion of intake airflow warning system indicator 198H and air intake pre-cleaner chamber 152 is a great advantage.

A brake means is included in the described embodiment. As used herein the brake means is defined as those structures which are adapted to brake the rotation of any of the wheels and any structure which perform functions equivalent thereto.

As an example of the brake means, disc brakes are desirably provided on the front wheels as represented at 158 in FIG. 4. Moreover, as an additional safety feature, the brake actuation system of the illustrated embodiment comprises an air over hydraulic arrangement, represented at 174, which provides power assist (air) braking even if the engine is non-operational or should fail for some reason.

Low profile vehicles such as the illustrated embodiment place severe demands on the braking means incorporated therein. It is a common problem that the brake linings present in such vehicles unnoticeably wear out and cause significant damage to the brake drums or rotors. Thus, the illustrated embodiment is provided with a brake wear warning system, as indicated at brake warning indicator 198C in FIG. 4, which illuminates when a brake lining wears out. The brake wear warning system incorporates a conductor embedded in each of the brake linings which is broken when wear to a certain point occurs at which point brake warning indicator 198C is actuated.

Also represented in FIG. 4 is a rear axle proportioning valve 162 which functions to distribute braking action between the front brakes and the rear brakes depending upon the distribution of the load on the frame. An automatic exhaust brake 166 is also included in the illustrated embodiment as represented at 166 in FIG. 4. Exhaust brake 166 allows the operator to reduce the vehicle speed without application of the friction brakes to the wheels.

The presently preferred embodiment also includes other braking means components which serve to increase the reliability and safety of vehicle operation. For example the illustrated embodiment includes dual brake actuation circuits (front and rear) each with their own master cylinders, hydraulic fluid reservoirs, and fluid lines.

The illustrated embodiment is also provided with an exhaust particulate trap 168 which traps particulate material present in the engine exhaust. The ceramic element presently preferred for use in the exhaust particulate trap is one available from Engine Control Systems, Ltd. of Canada. Detailed instructions concerning its use are available from the manufacturer. Using the disclosure contained herein and the instructions provided by the manufacturer, one of skill in the art will be able to readily incorporate the same into embodiments of the present invention.

Also shown in FIG. 4 are front wheels 110 which are used to steer the vehicle in cooperation with a steering mechanism as represented at 164 and including a steering wheel indicated at 220. The preferred vehicle chassis identified earlier is available with several different manual or power steering mechanisms which may be incorporated into different embodiments. Advantageously, the front axle turning angle of the illustrated embodiment is in the range from about 44° to about 49°, and preferably about 48°, which provides a conveniently small turning radius.

The illustrated embodiment also includes a front and a rear suspension system, generally designated at 165 and 167, respectively, which each include a stabilizer bar and shock absorbers. The drive train of the illustrated embodiment includes a transmission, generally identified at 170, and a lockup rear differential, generally identified at 160. Transmission 170 is the presently preferred example of a transmission means of the present invention.

Lockup rear differential 160 is actuated by the positioning of a switch (not shown) provided within the cab. Lockup rear differential 160 is preferred over limited slip differentials which are more prone to wear. Lockup rear differential provides the advantage of having power applied to both rear wheels when traveling over loose road surfaces without the operator having to leave the cab.

In the illustrated embodiment, it is preferred that transmission 170 be a manual transmission with five forward gears which is available as provided equipment on the preferred vehicle chassis. Similarly, it is preferred that lock-up rear differential 160 be that which is provided equipment on the preferred vehicle chassis. Alternatively, other commercially available alternatives may be incorporated into the embodiments of the present invention.

Furthermore, in order to increase traction, wheels 110 and 108 have mounted thereon an appropriate offroad tire. For example, front wheels 110 preferably have oversize (e.g., ten to fourteen inch wide tread face) tires mounted thereon to reduce front wheel "ploughing" on unstable surfaces. The inclusion of the described components provides a low profile vehicle with superior performance in low profile applications and which may also be taken on public roads and highways at normal speeds when required.

Those having experience in the vehicular arts will appreciate that the described dual rear wheels (108A and 108B in FIG. 4), lockup rear differential 160, and transmission 170 allow the illustrated embodiment to achieve high levels of traction. Prior art low profile vehicles generally incorporate "all wheel drive" schemes, with their higher initial cost and maintenance expenses, to maximize traction. By utilizing the described drive train and associated components, the illustrated embodiment is able to achieve superior traction without the added expense and complexity of incorporating an all wheel drive scheme.

As mentioned, one of the primary drawbacks found in prior art low profile vehicles is the lack of suitable safety and comfort features for the operator of the vehicle who regularly spends long hours maneuvering the vehicle. Many of the prior art vehicles leave the operator exposed to the surrounding environment while providing only a steel cage to protect the operator from falling objects.

In contrast to the prior art, the embodiments of the present invention provide operator comfort and safety features which are generally unknown in the prior art. By retaining nearly all of the desirable features of the cab of the preferred vehicle chassis, the completed low profile vehicle provides safety and comfort features heretofore unknown in low profile vehicles.

Referring still to FIG. 4, the completed cab, generally designated 200 (having been cut down as represented in FIG. 3A), is illustrated above the position it will occupy when attached to frame extension 130. Represented in FIG. 4 is a curved windshield 204 which provides excellent visibility for the operator and which has been heretofore unavailable in low profile vehicles.

Also illustrated in FIG. 4 are windshield wipers 212 and washers 214. A padded dashboard 216 is included in the described embodiment of the present invention. The features of windshield wipers 212, windshield washers 214, and a padded dashboard 216 increase operator comfort and promote safe operation of the low profile vehicle.

The illustrated embodiment is provided with several other features which increase efficient and safe operation of the vehicle. As represented in FIG. 4, an instrument panel 198 is provided with a speedometer 198A, a tachometer 198B, and dual air pressure gauges 198L. In addition to these basic instruments, the below listed instruments, and their associated components, are also provided:

| Reference Number | Description |
| --- | --- |
| 198C | Brake warning indicator |
| 198D | Oil pressure indicator |
| 198E | Charging indicator |
| 198F | Fuel filter indicator |
| 198G | Automatic glow plug indicator |
| 198H | Air intake restriction indicator |
| 198I | High beam indicator |
| 198J | Turn signal indicator |
| 198K | Exhaust brake indicator |

Also represented in FIG. 4 is an electrical circuit assembly 193 containing electrical relays, fuses, and other electrical components. The electrical circuit assembly is mounted in the cab providing easy access and protection from dirt and other contaminants found in the surrounding environment.

A side illumination lamp, one of which is indicated in FIG. 4 at 194, is provided on each side of engine cover 178. The appropriate side illumination lamp 194 is configured to operate when a turn signal control mounted in the cab is actuated. Thus, as the illustrated vehicle maneuvers on dark mine roadways, the operator is able to see down dark roadways before turning the vehicle. Also illustrated in FIG. 4 are tail lights/turn signals 196. A backup light 197 is also provided.

The cab of the illustrated embodiment is provided with two entry doors identified as 206A and 206B in FIG. 4. As shown in FIG. 4, doors 206A and 206B are provided with a forward mounted release handle (one of which is shown at 189) which are easy to reach and operate. In contrast, prior art low profile vehicles are provided with crude door release mechanisms which are inconveniently mounted in back of the operator's seating position or in some other inconvenient location.

The entry doors are preferably those which are supplied with the preferred vehicle chassis and modified in accordance with the present invention. Each of entry doors 206A and 206B are provided with a vertically sliding widow 208 which is operable by a crank, one of which is represented at 210 in FIG. 4. Also provided are pivoting vent windows 187.

Entry doors 206A and 206B and vertically sliding windows 208 provide for easy access into and out of the cab and also allow the operator to determine the amount of exposure to the surrounding environment which is desirable. The cab is also provided with a heater 191 and two seats 218 which are commercially available.

FIG. 4 also shows an engine cover 178 which is ready to be secured to the split level frame over engine 150. Engine cover 178 functions to protect the engine and associated components from damage. Engine cover 178 includes a removable panel 180 to allow access to the top of the engine. A door 182 is provided on each side of the engine cover to allow access to the components contained therein after the cover is secured in place. Also provided on the engine cover is an exhaust port 196.

The techniques and materials necessary to incorporate the mentioned featured components into embodiments of the present invention are available to those dealing in the applicable arts, are available commercially, and/or are provided with one or more models of the preferred vehicle chassis.

It will be understood by those familiar to the applicable arts that the above described features are generally not found in prior art low profile vehicles even though they contribute greatly to the performance and the safe and efficient operation of the vehicle. Furthermore, the combination of several of the described features has been unavailable in any prior art low profile vehicle and provides the described embodiment even greater performance and safety.

Also illustrated in FIG. 4 is a general purpose utility body 176 which is one example of the body means of the present invention. Other examples of the body means which may be incorporated into embodiments of the present invention will be described later in connection with FIGS. 6-11. Advantageously, body 176 may be readily interchanged with other examples of bodies which function as the body means of the present invention.

Figure 4A:
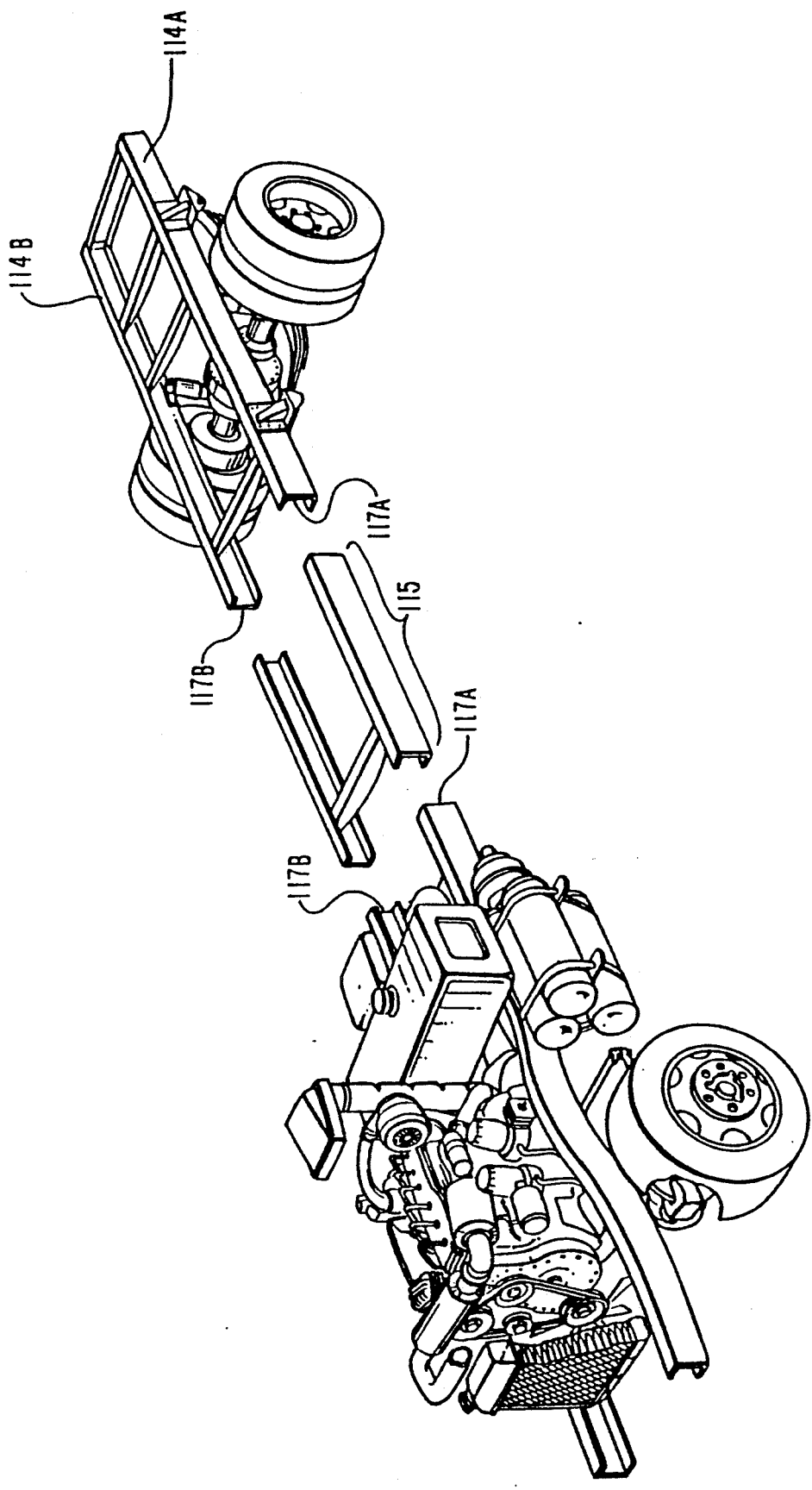
FIG. 4A is a perspective view of the frame of the illustrated embodiment undergoing the step of being shortened.

It is presently preferred that the frame of the preferred vehicle chassis be shortened to provide a shorter wheelbase. FIG. 4A illustrates the removal of a portion, indicated by bracket 115, of frame rails 114A and 114B, and reconnecting the remaining ends (117A and 117B) of the remaining frame rails, resulting in a shorter frame. It is preferred that the wheelbase of the completed low profile vehicle be in the range from about eighty to about one hundred fifty inches.

Figure 5:
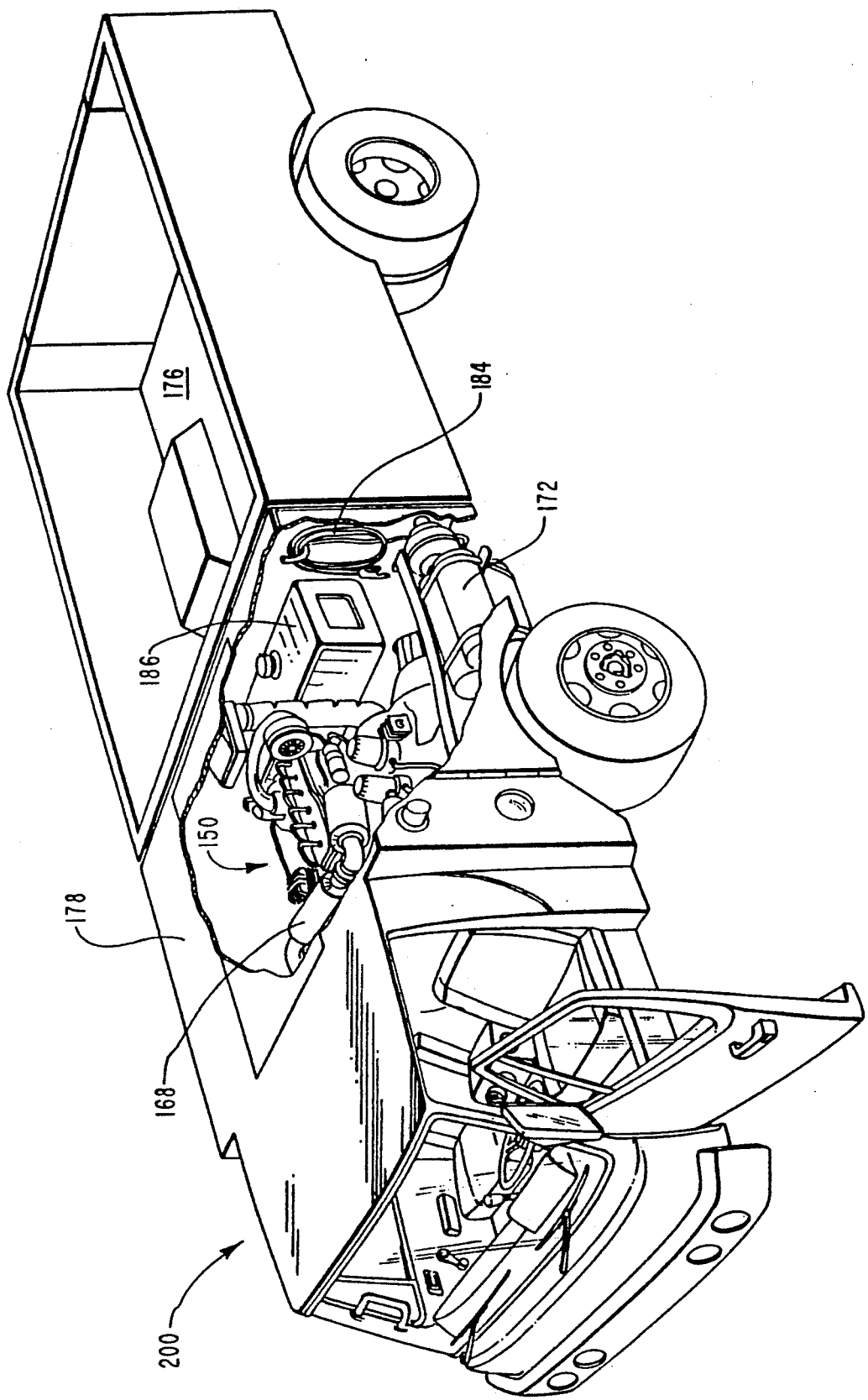
FIG. 5 is a partially cut away perspective view of the low profile vehicle illustrated in FIG. 1 showing additional components installed thereon.

Referring next to FIG. 5, a partial cut away perspective view of the completed presently preferred low profile vehicle is provided. Cab 200, engine housing 178, and body 176 are shown attached to the frame.

Represented in FIG. 5 is a fuel tank 186 positioned under the engine cover. Also positioned under the engine cover are air tanks 172 which supply air pressure for the brake system. An air hose 184 is also provided to facilitate the cleaning of the engine and other vehicle components with a stream of compressed air. Use of air hose 184 is particularly important in coal mining operations since coal dust layered on hot engine components may ignite.

As can be seen in FIG. 5, the completed low profile vehicle provides a spacious operators cab with numerous safety and comfort features. Advantageously, the spaciousness of the operators cab is retained while still maintaining a maximum vertical height of less than eighty inches, and preferably less than fifty-five inches. Moreover, the illustrated low profile vehicle may be built much more economically than prior art low profile vehicles not having the mentioned desirable features.

One of the great advantages of the present invention is that one low profile vehicle chassis may be used as a platform for many different bodies. Thus, an owner of a fleet of low profile vehicles manufactured according to the present invention can stock a single inventory of repair parts and is only required to deal with identical or very similar chassis all sharing identical parts. This is in contrast to the prior art scheme of designing and manufacturing a different chassis depending upon the end use of each low profile vehicle.

Figure 6:
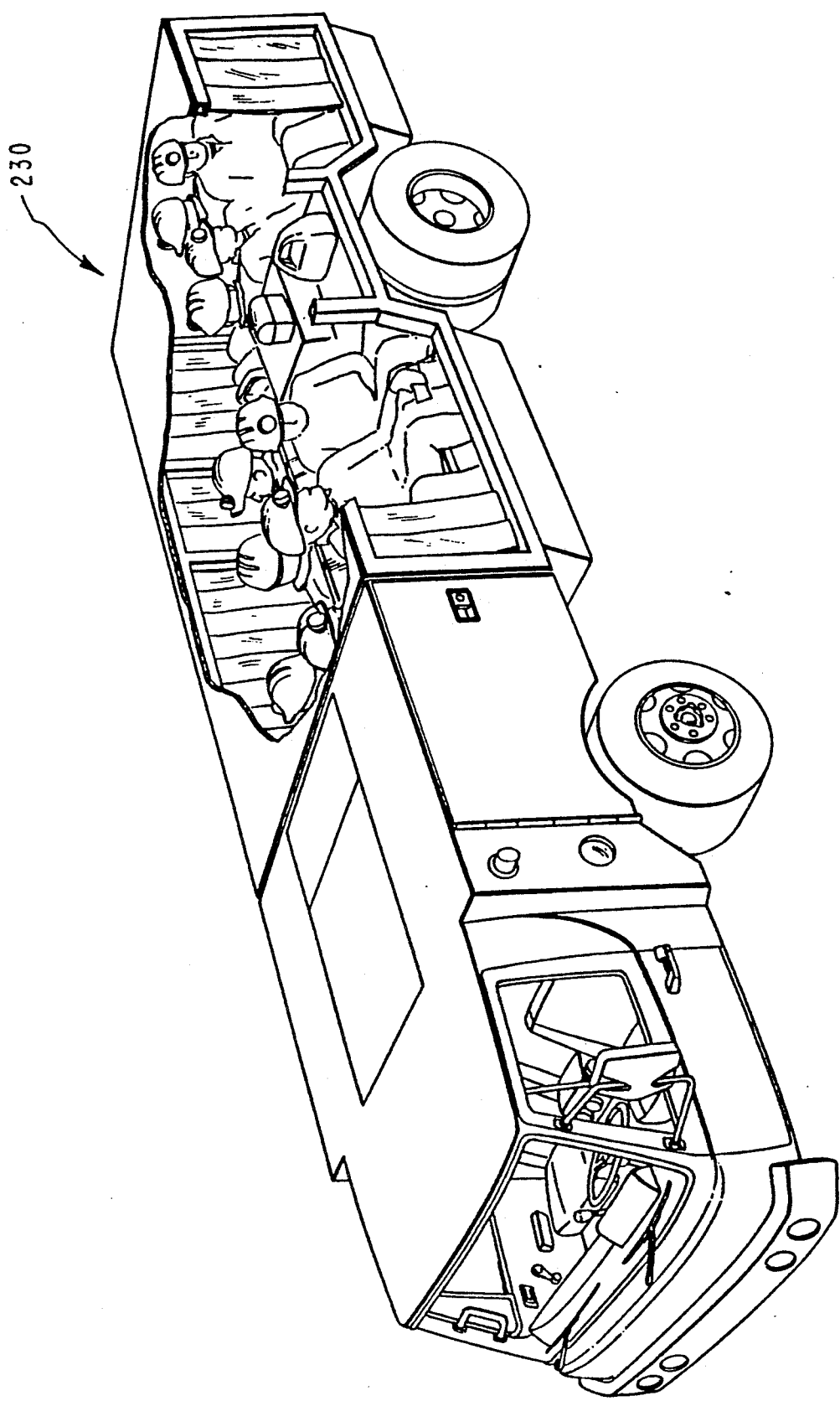
FIG. 6 is a partially cutaway perspective view of the low profile vehicle of the present invention with a personnel carrier body installed thereon.
Figure 7:
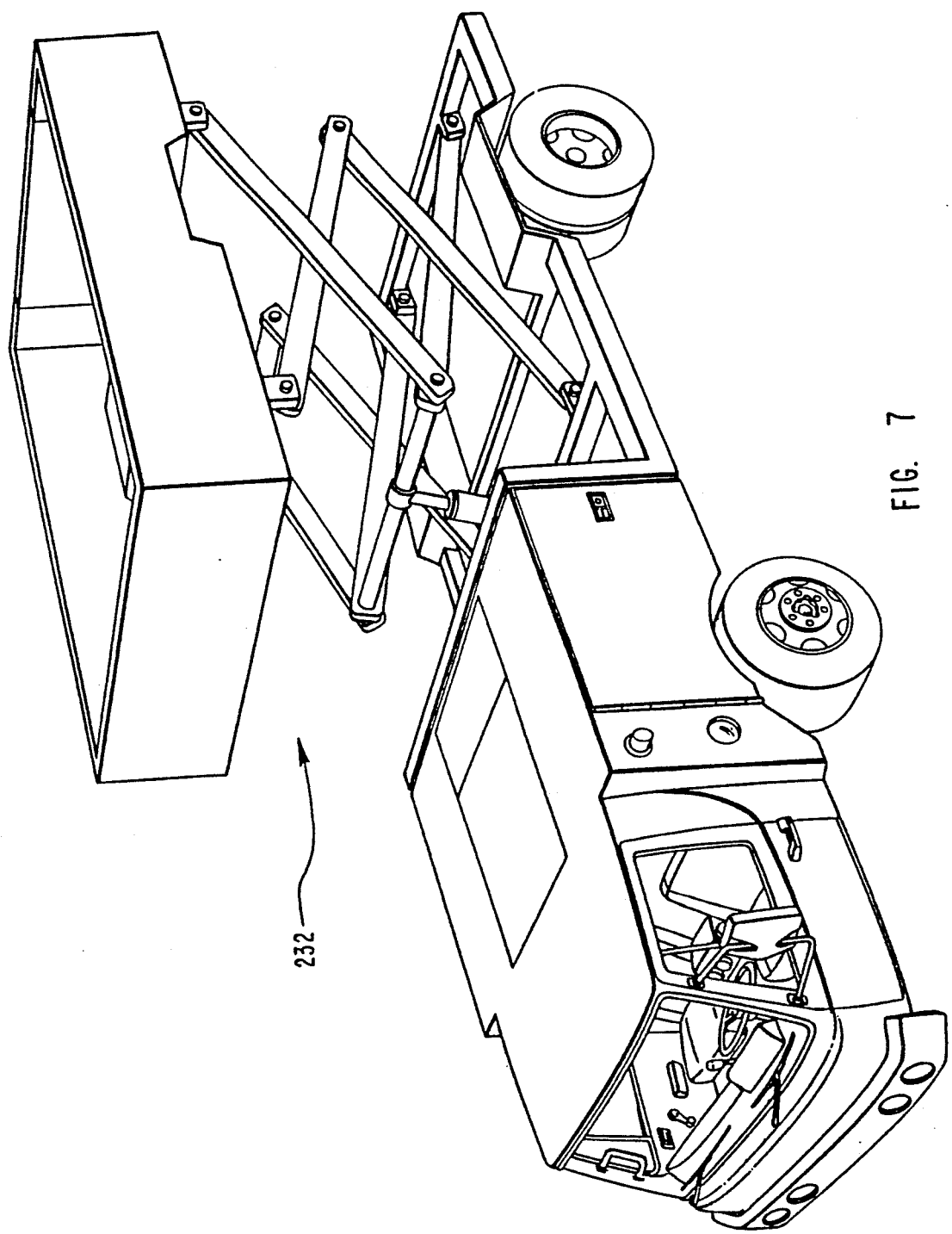
FIG. 7 is a perspective view of another low profile vehicle of the present invention with a telescopic scissor lift body installed thereon.

Referring next to FIG. 6, the low profile vehicle of the present invention is illustrated as having a personnel carrier body 230 attached to the frame. FIG. 7 shows the low profile vehicle of the present invention having a telescopic scissor-type lift body 232 mounted thereon. Suitable lifts are known and available in the art and may be readily incorporated into the present invention using the teachings contained herein.

Figure 8:
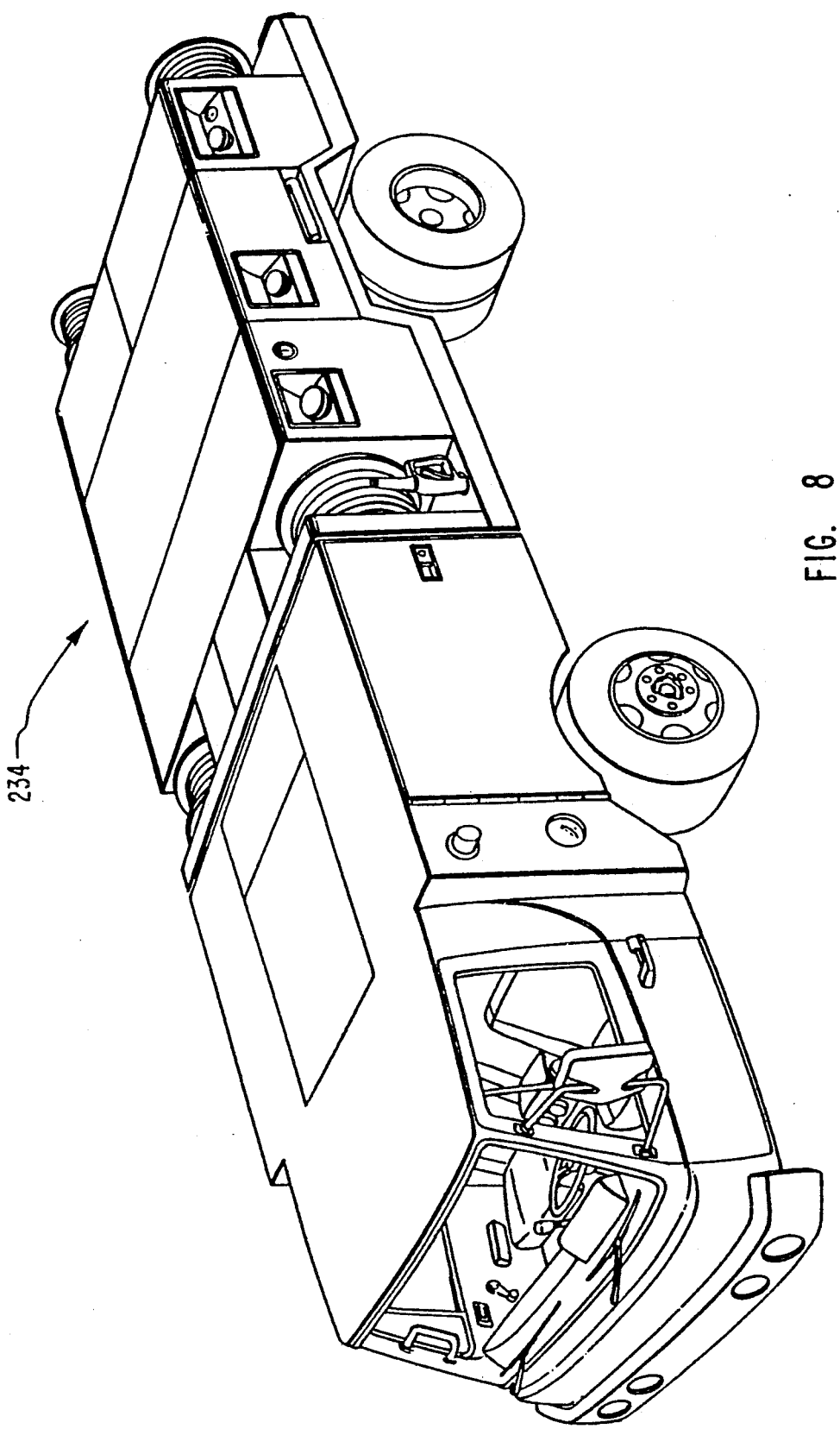
FIG. 8 is a perspective view of another low profile vehicle of the present invention with a fuel and lubrication body installed thereon.
Figure 9:
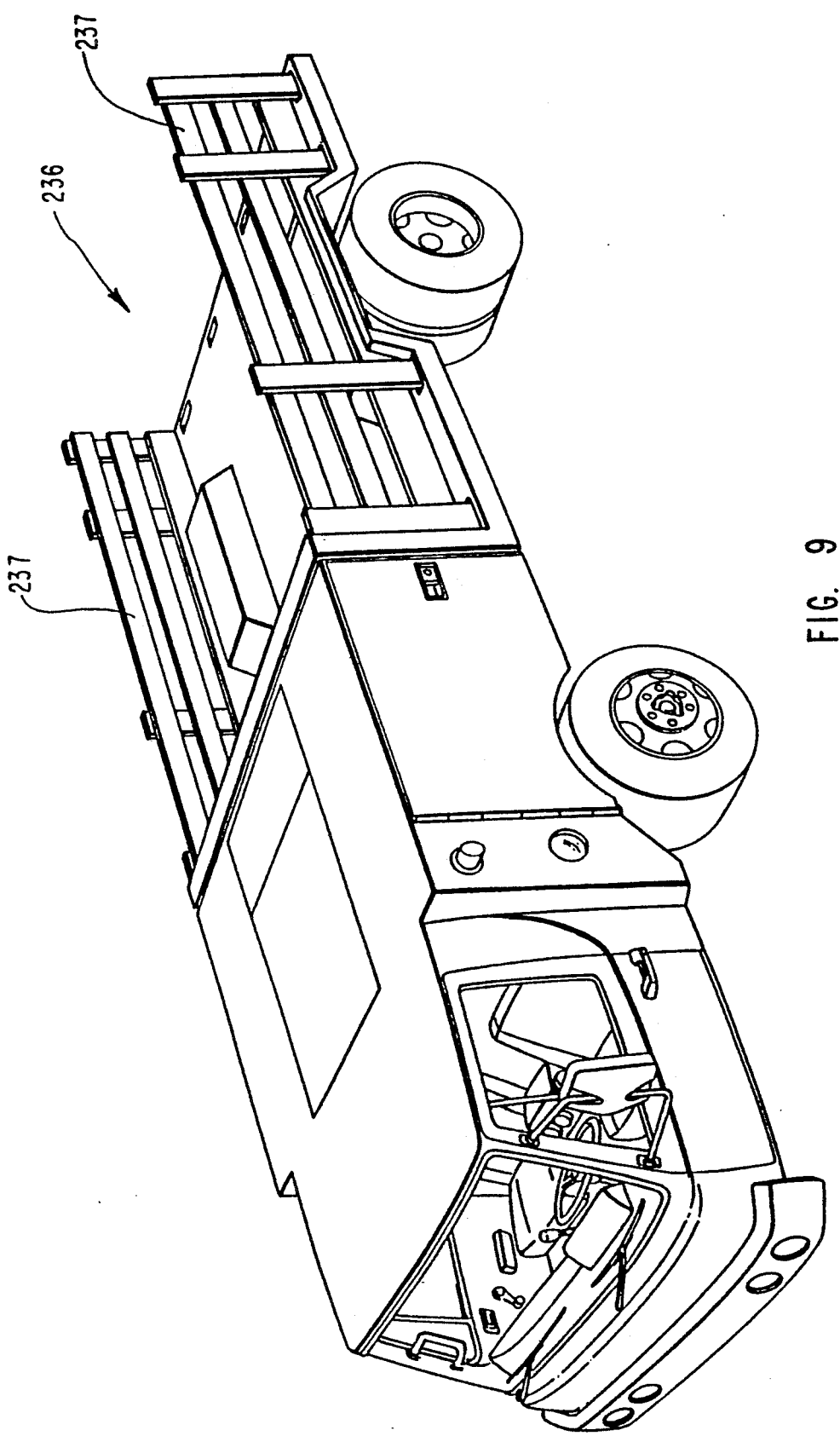
FIG. 9 is a perspective view of another low profile vehicle of the present invention with a stake bed utility body installed thereon.
Figure 10:
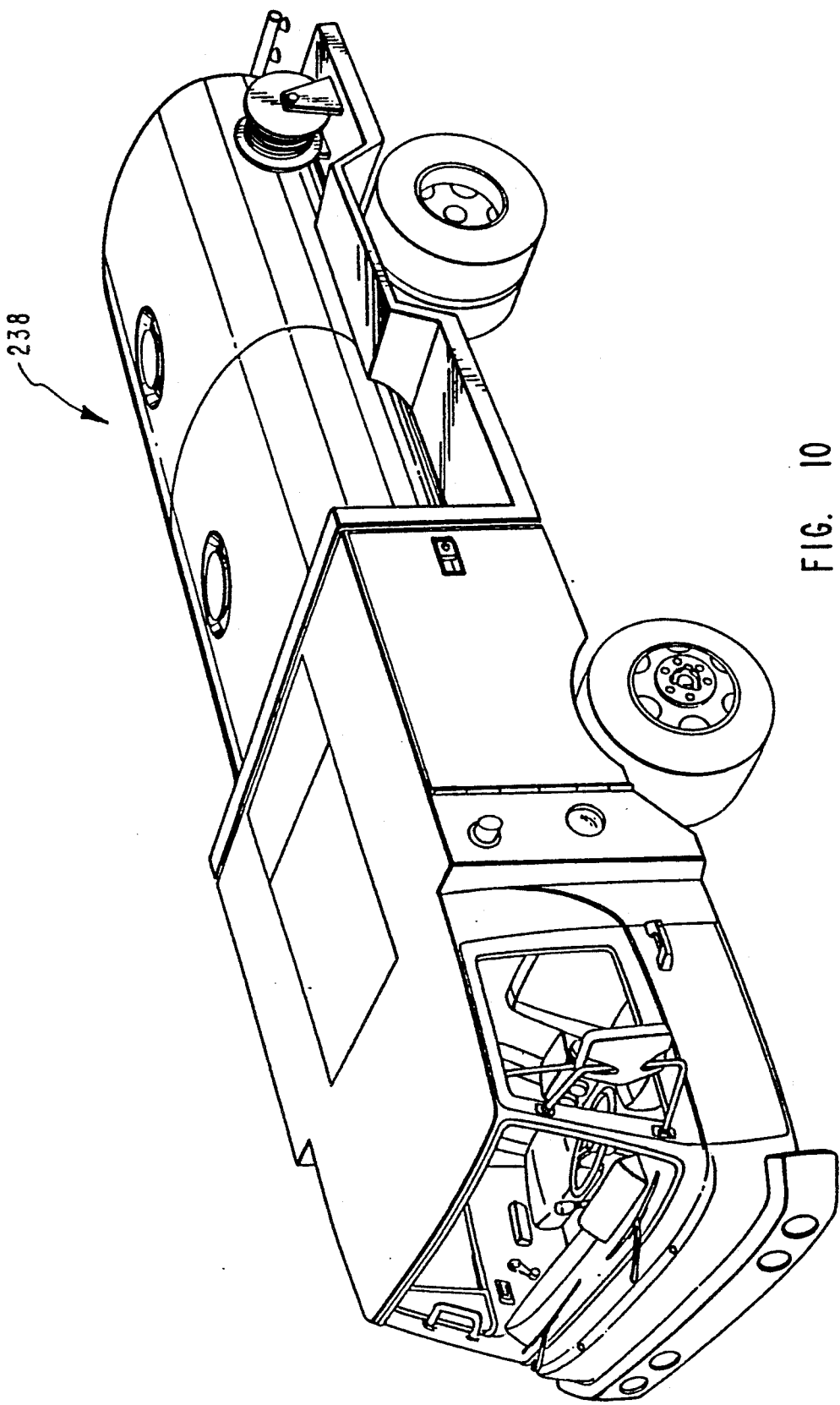
FIG. 10 is a perspective view of another low profile vehicle of the present invention with a fresh water/waste water tank body installed thereon.

The described low profile vehicle represented in FIG. 8 has a body including lubrication and fuel tanks 234 installed thereon. Still further, FIGS. 9 and 10 show the completed low profile vehicle with a stake bed utility body 236, with side rails 237, and a fresh water/waste water tank body 238, respectively, installed thereon.

Figure 11:
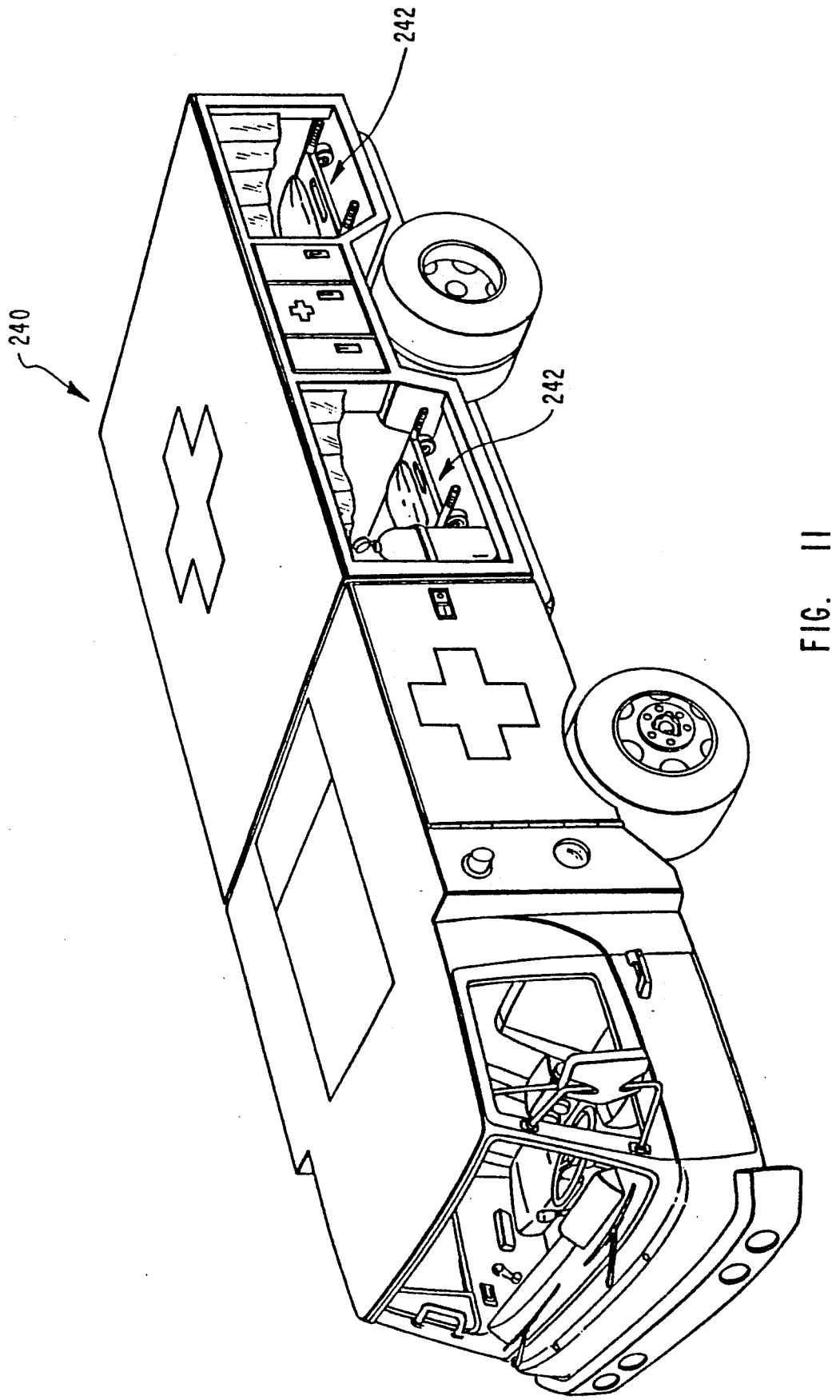
FIG. 11 is a perspective view of another low profile vehicle of the present invention with a medical assistance and transport body installed thereon.

Even further, FIG. 11 illustrates the completed low profile vehicle with a medical assistance and transport body 240 thereon. The medical assistance and transport body is provided with various equipment compartments and alcoves 242 for transporting stretchers therein. It will be appreciated that all of the described bodies, as well as other bodies, may function as the body means of the present invention.

2. Detailed Description of the First Preferred Method of the Present Invention

Provided below in Groups A-J are the presently preferred steps used to fabricate the low profile vehicle described herein. It will be appreciated that the below listed steps are merely those which are presently preferred and that other steps may be used to arrive at the low profile vehicle.

Using the steps listed below, and the teachings contained above, those of skill in the art will be able to make and use the embodiment described herein and other similarly functioning and featured embodiments. The contents of each of the below-listed groups are as follows:

| Group | Contents |
| --- | --- |
| A | Front Chassis Disassembly |
| B | Front Chassis Reassembly |
| C | Center Chassis Disassembly |
| D | Center Chassis Reassembly |
| E | Rear Chassis Disassembly |
| F | Rear Chassis Reassembly |
| G | Final Assembly |
| H | Cab Subassembly, Fabrication & Modification |
| I | Center Subcomponent Fabrication |
| J | Rear Subcomponent Fabrication |

GROUP A—FRONT CHASSIS DISASSEMBLY

1. REMOVE BATTERY BOX & CABLES

Remove the battery box assembly from the frame. Unbolt the negative battery cable from the frame and remove. Cut the positive cable at 36" from the battery end, and remove. Save all parts for reuse later.

2. REMOVE CAB GRILLE

Loosen the mounting screws on the grille hinges, and remove the radiator grille from the cab.

3. REMOVE LH/RH CAB DOORS

Remove the bolts securing the door hinges to the door framework, and remove both of the cab doors. Save the doors for modification and reuse later.

4. REMOVE FRONT WINDSHIELD

Cut the outer lip off of the windshield weatherstrip, and carefully remove the front windshield. Store for reuse later.

5. DRAIN RADIATOR COOLANT

Drain fluid from the radiator petcock into a 5 gallon bucket. Retighten the petcock, and save the fluid for reuse later.

6. DRAIN CLUTCH FLUID

Disconnect and remove the clutch flexible line under the cab, and cap the fitting under the cab. Remove the ¼" steel line on the LH frame, and cap the fitting ends. Drain the fluid into a bottle to be reused later.

7. DRAIN POWER STEERING FLUID

Drain the power steering fluid into a container for reuse later.

8. RELEASE AIR TANK PRESSURE

Release all of the air pressure in the system.

9. REMOVE PARKING BRAKE VALVE

Remove and modify the parking brake valve.

10. CUT HEADLAMP WIRING

Cut the headlamp wiring. Remove the headlamp assemblies.

11. COVER AIR INTAKE OPENING

Cover the air intake opening behind the RF wheel with a plastic or heavy cloth cover, and secure with tape.

12. REMOVE STEERING WHEEL ASSEMBLY

Remove the steering wheel assembly. Save all parts for reuse.

13. REMOVE SEATS FROM THE CAB

Remove the driver and passenger seats from the cab.

14. DISCONNECT ACCELERATOR CABLE

Disconnect the cable from the injection pump and the fixing bracket on the engine. Cut the cable off of the cab at the foot pedal and discard the cable.

15. CUT MAIN WIRING HARNESS

Cut and label both ends of each of the individual wires in the main and auxiliary wiring harnesses.

16. REMOVE CLUTCH & BRAKE PEDAL ASSEMBLY

Remove the pedal assembly from the cab.

17. REMOVE HEATER ASSEMBLY

Remove the heater assembly and control panel from the cab and save for modification and reuse later. Remove the defroster ducts leading to the RH & LH dash vents and save for reuse later

18. REMOVE GLOVE BOX ASSEMBLY

Remove the glove box assembly, and discard.

19. REMOVE WINDSHIELD FLUID RESERVOIR

Remove the windshield fluid reservoir with its upper mounting bracket, and save for reuse later.

20. REMOVE GEAR SHIFT LEVER ASSEMBLY

Remove the gear shift lever assembly from the cab. Loosely reassemble the upper and lower plates, and save for reuse later.

21. REMOVE THE CAB FROM THE FRAME

Remove the cab assembly.

22. REMOVE CAB TORSION BAR ASSEMBLY

Remove the torsion bar bases.

23. REMOVE FRONT BUMPER & FRAME TUBE

Unbolt the power steering valve and bracket from the front frame tube. Remove the front bumper and front frame tube.

24. REMOVE STEERING GEARBOX & LINK ROD

Disconnect all fluid lines to the gearbox, and seal with temporary caps. Remove the two fluid lines running from the gearbox to the fluid control valve in front of the radiator, and discard. Leave the "T" fitting and the shut-off valve in the 12 mm steel line fastened to the gearbox for reuse later. Disconnect the link rod on both ends using a spreader fork. Unbolt the gearbox from the frame. Remove the gearbox and the link rod and save for modification later.

25. REMOVE GEARBOX MOUNTING BRACKET

Remove the gearbox bracket.

26. REMOVE MISCELLANEOUS PARTS

Remove the lower radiator guard and save for modification and reuse later. Unbolt the oil dipstick and oil filler tube from the frame. Remove the oil filler tube for modification and reuse later. Remove the horn and mounting bracket from the frame, and save for reuse later.

27. REMOVE GEAR SHIFT LINK ROD

Unbolt the link rod and support bracket from the frame. Unbolt the stiffener rod from the transmission, and remove the link rod and front bracket from the frame. Save the stiffener and link rods for modification and reuse later. Place a new bolt in the top of the transmission in the hole previously used by the stiffener rod end.

28. REMOVE EXHAUST SYSTEM COMPONENTS

Unbolt and remove selected exhaust system components.

29. CUT FRONT FRAME

Mark and saw cut the front frame channels. Discard the cut off pieces of channel.

GROUP B—FRONT CHASSIS REASSEMBLY

1. MODIFY COOLANT FILLER BOTTLE

Lower the position of the coolant filler bottle.

2. MODIFY CAB TILT WARNING CIRCUIT

Disconnect and terminate the tilt cab wiring harness.

3. REPLACE FRONT WHEELS & TIRES

Lift up the front of the chassis and remove the front wheels and tires. Install the new 14.00×17.50 tires and wheels.

4. INSTALL AIR LINE FITTINGS

Cut square ends on each of the air lines located on the LH side of the radiator using a hand tubing cutter. Install new brass inserts, ferrules, and nuts on the six 12 mm plastic air lines and the two 8 mm plastic air lines.

5. CONNECT CAB ASSEMBLY TO CHASSIS

Weld the frame of the cab assembly to the front of the chassis frame.

6. INSTALL CLUTCH HYDRAULIC LINES

Install the ¼" clutch fluid lines.

7. CONNECT THROTTLE CABLE

Using a 7/16" drill bit, drill out the cable bracket hole at the injection pump to accommodate the new cable. Thread the throttle cable in front of the radiator, and through the RH frame channel to the injection pump. Connect the cable to the bracket and to the ball on the injection pump lever. Adjust the cable for full throttle operation using the adjustment nuts on both ends of the cable. Tighten all nuts in position.

8. RECONNECT ALL WIRING HARNESS

Connect the matching numbered ends of the harness wires to the ends of each of the extension wires located at the rear of the cab. After crimping each butt connector, insulate each wire end with shrink wrap, and then remove the wiring labels as each wire is connected. Insert each of the completed wires into the upper harness. Next connect the wires supplying the heater fan, the speedometer, the windshield washer pump, the parking brake control valve, the front headlamps, the horn; the cab dome light, and the side turning lights.

9. SECURE ALL ITEMS UNDER DASHBOARD

Disconnect and discard the wiring harnesses under the right and left sides of the dashboard which previously went to the radio and cab clearance lights, to the dome light switches in each door, and to the radio speakers in each door. Coil all other unused harnesses together, and secure under the dashboard using tie wraps to make sure that all harnesses are secure and out of the way of the operator's and passenger's feet locations, and out of the way of any moving parts which would damage the wiring. Make sure all hoses and harnesses are tie wrapped and out of the way of moving parts, or of foot positions.

10. INSTALL GEAR SHIFT LINK ROD

Install the gear shifter link rod through the back of the cab. Connect the rod to the shift lever, to the transmission. Install the stabilizer arm bracket to the transmission bell housing. Connect the stabilizer arm to the bracket and to the link rod. Adjust for proper shift lever centering and proper operation in all gears.

11. CONNECT BRAKE AND LOCKING AXLE AIR LINES

Connect the six 12 mm air lines and the two 8 mm air lines proceeding out of the back of the cab to the matching lines running down the LH frame channel. Be sure to follow the color code labels when reconnecting the ends of the lines together. Tighten all line nuts. Make sure that the lines are tie-wrapped clear of the gear shift link rod.

12. INSTALL STEERING COMPONENTS

Install the steering gearbox, pitman arm, drag link, fluid lines, and input shaft pieces.

13. INSTALL RADIATOR GUARD

Install the lower radiator guard on the back of the cab wall, using 12 mm×35 mm bolts, nuts, and locks. Be sure that the guard tabs are bent so that it does not touch the bottom of the gear shifter link rod.

GROUP C—CENTER CHASSIS DISASSEMBLY

1. REMOVE DRIVE LINES & CARRIER BEARING ASSEMBLY

Remove both drive lines and the carrier bearing assembly from the frame. Save the rear drive line for reuse. Discard the front drive line and carrier bearing.

2. REMOVE FUEL TANK & FUEL FILTER ASSEMBLIES

Remove the fuel tank and brackets from the frame. Then remove the fuel filter assembly from the frame. Save all parts for reuse later.

GROUP D—CENTER CHASSIS REASSEMBLY

1. SHORTEN CHASSIS WHEELBASE

Cut tie wraps and loosen brackets for all wiring, hoses and tubing in the area to be cut out of the frame. Shorten the chassis wheelbase to 100 inches.

2. REMOUNT PARKING BRAKE VALVE & SERVO CANISTER

Use the drilling template and remount the parking brake valve and servo canister.

3. REMOUNT MISCELLANEOUS PARTS

Remount the oil dipstick, the oil filler tube, the remote start switch, and the power steering valve on the chassis.

4. RECONNECT CHASSIS BRAKE LINE

Reconnect the brake line in the LH frame channel.

5. INSTALL AIR INTAKE SHIELD

Install the shield over the air intake pipe.

6. REMOUNT FUEL TANK

Modify and remount the fuel tank in its brackets on the engine cover.

7. REMOUNT DRIVE LINE

Install the modified rear drive line between the transmission and the rear axle. Tighten the flange bolts to 150 Ft./lbs.

8. INSTALL ENGINE COVER ASSEMBLY

Install the pre-assembled engine cover assembly over the engine, and weld in position to the chassis.

9. INSTALL EXHAUST SYSTEM

Install the exhaust system between the turbocharger and the tail pipe.

10. REMOUNT FUEL FILTER ASSEMBLY

Remount the fuel filter assembly and fuel lines on the inside of the engine cover.

11. REMOUNT GLOW PLUG BOX

Remount the glow plug relay box on the inside of the engine cover.

12. INSTALL SPLASH SHIELDS

Install the alternator and steering splash shields.

13. RECONNECT EXHAUST BRAKE LINE

Reconnect the air line supplying the exhaust brake.

14. RECONNECT FUEL TANK WIRING

Reconnect the fuel tank wiring harness.

GROUP E—REAR CHASSIS DISASSEMBLY

1. EXCHANGE REAR TIRES

Lift up the rear of the chassis, and remove the highway tires and wheels. Exchange the highway tires with off-road tires.

2. SHORTEN REAR CHASSIS

Remove the rear light bar and cut off the rear frame pieces.

GROUP F—REAR CHASSIS REASSEMBLY

1. INSTALL REAR BUMPER

Install the rear bumper and light bar.

2. INSTALL SPARE TIRE CARRIER

Install the spare tire carrier.

3. INSTALL BATTERY BOX

Install the battery box assembly.

4. CONNECT CHASSIS CABLES

Reconnect the RH and LH chassis cables.

5. INSTALL BACKUP ALARM

Install the backup alarm.

6. INSTALL REAR CARGO BODY ASSEMBLY

Install the cargo body on the truck chassis and secure in place.

GROUP G—FINAL ASSEMBLY

1. TOUCHUP PAINT CAB AND BODY
2. INSTALL VEHICLE LABELS
3. INSTALL SPARE TIRE

Install the spare tire and wheel in the spare tire carrier, and secure in place with the retaining rod.

4. INSTALL VEHICLE JACK

Install the vehicle jack on the mounting pins in the rear cargo body.

5. QUALITY ASSURANCE INSPECTION

GROUP H—CAB SUBASSEMBLY FABRICATION & MODIFICATION

1. FABRICATE PEDAL ASSEMBLY BRACKETS

Fabricate the front and rear support brackets for the pedal assembly.

2. MODIFY PEDAL BRACKET AND PEDAL ARMS

Modify the center pedal bracket, and the actuating arms for the clutch and the brake pedals.

3. FABRICATE THROTTLE CABLE

Fabricate the throttle cable assembly.

4. FABRICATE THROTTLE PEDAL & CABLE BRACKET

Fabricate a throttle pedal assembly and the front cable bracket.

5. FABRICATE CAB FRAME, FLOOR, & Z BAR

Fabricate the cab frame, floor panel, and Z bar.

6. FABRICATE FRONT BUMPER

Fabricate the front bumper.

7. ASSEMBLE CAB FRAME, FRONT BUMPER, AND FLOOR

Assemble the cab frame and front bumper. Then weld the floor onto the framework as shown.

8. INSTALL CLUTCH AND BRAKE PEDAL ASSEMBLY

Install the pedal assembly on the cab floor with the new front and rear mounting brackets.

9. INSTALL THROTTLE PEDAL, CABLE, AND BRACKET

Install the throttle pedal, bracket, and cable on the cab floor.

10. CUT CAB SECTION

Prepare then cut and remove the cab section to be reused.

11. MODIFY CAB

Mark and cut the cab firewall and dashboard and install 6 mm jack nuts in the door jambs for the lower door hinges.

12. FABRICATE CAB REAR WALL, ROOF, & ROOF SUPPORTS

Fabricate the cab rear wall, the roof panel, and the two roof supports.

13. POSITION CAB REAR WALL

Position the cab rear wall on the cab floor and frame, align in position, and tack in place.

14. POSITION CAB SECTION & ROOF

Prepare and position the cab section on the assembled cab floor and frame and check for proper door frame dimensions and tack in position. Next position and tack the cab roof in position.

15. WELD & TRIM CAB ASSEMBLY

Weld the cab section to the floor and framework. Weld the cab roof and rear wall to the cab section. Trim the excess off of the edges of the cab floor and the cab back wall, and finish grind all edges.

16. MODIFY STEERING WHEEL BRACKET & SHAFT

Drill out the steering wheel bracket holes, and modify the steering shaft.

17. INSTALL STEERING COMPONENTS

Weld the steering gearbox mounting plate on the torque tube behind the cab. Install the necessary steering components on the cab floor.

18. FABRICATE WIRING HARNESS DUCTS & TRIM COVER

Fabricate the plastic outer ducts for the wiring harnesses and the brake lines, using the two plastic defroster hoses. Next fabricate the metal cover for the plastic hoses also.

19. FABRICATE GEAR SHIFT MOUNTING BRACKET

Fabricate the mounting bracket for the gear shift lever, the parking brake control, and the locking rear axle control.

20. FABRICATE GEAR SHIFT LINK ROD

Fabricate the gear shift link rod, and stiffener rod bracket.

21. MODIFY GEAR SHIFT LEVER

Modify the gear shift lever.

22. INSTALL GEAR SHIFT LEVER & OTHER VALVES

Assemble the shift lever, the parking brake valve, and the locking rear axle valve on the control panel. Connect the fabricated air lines to the two air controls. Install the control panel assembly on the cab floor and weld in position. Feed all air lines out the rear cab opening.

23. REMOVE CIGARETTE LIGHTER ASSEMBLY

Unplug the wires on the back of the cigarette lighter unit. Unscrew the unit from the dash and discard it.

24. MODIFY HEATER ASSEMBLY

Modify the heater assembly to fit.

25. INSTALL HEATER ASSEMBLY

Install the heater assembly on the back wall of the cab. Cut approximately 7 inches off the end of the two heater hoses, and connect to the water ports on the heater assembly. Secure the hoses to the heater ports with hose clamps.

26. FABRICATE WIRING HARNESS SECTIONS

Fabricate all the wiring harness sections required to reconnect the chassis harness, the headlamps, the horn, the windshield washer pump, the heater fan, the speedometer wiring, and the horn.

27. INSTALL CAB BRAKE AND CLUTCH LINES

Install the four new 12 mm plastic air lines and connect to the brake pedal valve. Run the air lines through the lower plastic duct, and exit them out the back of the cab. Install the front clutch fluid line in the cab in its nylon brackets. Shorten the blue plastic fluid line between the clutch fluid reservoir and the clutch master cylinder by 2.5 inches, and reconnect it to the master cylinder port. Remove the clear plastic discharge hose on the brake pedal valve. Loosen the nut on the discharge port on the brake pedal valve, and rotate it until it points towards the front cab firewall, and re-tighten the bolt. Shorten the air discharge hose by inches, reattach it to the discharge port, and run the hose through the hole in the front firewall. Shorten the clutch fluid reservoir drain hose by 16 inches, and run the hose through the same hole in the front firewall. Use a tie wrap to secure the two hoses together.

28. INSTALL CAB WIRING HARNESS SECTIONS

Connect the required wiring harness sections to the cables under the dashboard and run them in the center harness ducts to the rear of the cab. Be sure to retain a unique number label on each wire extended to the back of the cab, in order to ensure proper final cable connections to the harness wires at the rear of the cab which proceed to the chassis.

29. MODIFY CAB DOORS
Modify the LH & RH cab doors.
30. INSTALL CAB DOORS
Install the cab doors. Check for proper hinge operation, and for proper exterior panel alignment and edge gap.
31. INSTALL WINDSHIELD WASHER RESERVOIR
Mount the reservoir to the rear of the cab.
32. BODY PANEL WORK
Repair all body panel imperfections. Finish sand all repaired areas suitable for primer painting.
33. MASK AND PAPER CAB FOR PAINTING
Thoroughly clean all debris off out of the cab floor. Cover all non-paint items on the inside and outside of cab with masking tape and paper. Roll up the door windows and paper the inside and outside of the window moldings. Wipe down all metal surfaces for painting with Stoddard solvent and allow to dry. Wipe down all surfaces for painting with a tack cloth. Move the cab to the painting area.
34. PAINT CAB ASSEMBLY
Apply primer paint to all repaired surfaces and to all bare metal surfaces on the cab. Apply 2 finish coats of paint to all unmasked surfaces of the cab. Move the cab to the curing area.
35. CAB DETAILING
Remove all tape and paper from the cab. Clean up any over spray on any non-paint surfaces.
36. INSTALL SEATS & DOORS, DOOR TRIM, AND WINDSHIELD Install the cab seats and the inside door panels and handles on the doors. Next cut to length and install the weatherstripping on the door frame edges on both door openings. Next install the front windshield.
37. INSTALL TIRE WRENCHES AND FIRE EXTINGUISHER
Install the tire wrenches on their bracket on the rear cab wall. Install the fire extinguisher in its bracket next to the passenger seat.
38. MODIFY STEERING GEARBOX INPUT SHAFT Cut a key way in the power steering gearbox input shaft, using an EDM machine.
39. FABRICATE STEERING COMPONENTS
Fabricate the rear angle gearbox bracket, the ¾ inch input shaft, and the 1¼ inch input shaft and install the same.

GROUP I—CENTER SUBCOMPONENT FABRICATION

1. FABRICATE EXHAUST TAIL PIPE
Fabricate the exhaust tail pipe.
2. FABRICATE AIR INTAKE SHIELD
Fabricate the air intake shield.
3. FABRICATE CLUTCH LINE
Fabricate the additional piece of ¼" steel line required for the two sections of clutch line.
4. FABRICATE PLASTIC AIR LINES
Fabricate the additional pieces of 12 mm and 8mm plastic air line required for the foot brake, the parking brake, and the lockup differential air lines.
5. FABRICATE STEERING GEARBOX MOUNTING PLATE
Fabricate the ¾" thick steering gearbox mounting plate.
6. FABRICATE POWER STEERING LINES
Fabricate the two steel power steering lines which connect to the steering gearbox.
7. MODIFY STEERING LINK ROD, & PITMAN ARM Modify the steering link rod, and the pitman arm.
8. MODIFY REAR DRIVE LINE
Shorten the rear drive line.
9. EXCHANGE FRONT & REAR TIRES
Install 8.00×17.5 traction tires on the rear wheels. Inflate to 35 psi. Install two 14.00×17.5 tires on two 10×17.5 front wheels. Inflate to 45 psi, and balance both front wheels.
10. FABRICATE EXHAUST MANIFOLD
Fabricate the exhaust manifold.
11. FABRICATE EXHAUST BRAKE FITTINGS
Fabricate the two pipe fittings with flanges which attach to each end of the exhaust brake valve.
12. FABRICATE ENGINE COVER ASSEMBLY
Fabricate the engine cover assembly.
13. FABRICATE ENGINE COVER DOORS
Fabricate the engine cover doors.
14. FABRICATE FRONT WHEELS
Fabricate the axle steel wheels.
15. MODIFY RADIATOR GUARD
Modify the lower radiator guard.
16. FABRICATE SPLASH SHIELDS
Fabricate the alternator and steering splash shields.

GROUP J—REAR SUBCOMPONENT FABRICATION

1. FABRICATE REAR BUMPER
Fabricate the rear bumper assembly.
2. FABRICATE REAR BOX ASSEMBLY
Fabricate the rear box assembly.
3. FABRICATE SPARE TIRE CARRIER
Fabricate the spare tire carrier.
4. FABRICATE FRAME BRACKETS
Fabricate the frame brackets used to shorten the frame channels.
5. FABRICATE WOOD BED SPACERS
Fabricate the oak bed spacers.
6. FABRICATE TAILGATE HARDWARE
Fabricate the tailgate hardware.

3. Method and Structure of the Second Described Embodiment

In a below ground mine it is often the case that it is only necessary to transport a few items or a few workers through a mine tunnel. In such cases, it is inefficient to operate a large low profile vehicle with its large cargo capacity. Thus, mining operations routinely require smaller below ground mining vehicles to provide efficient transportation through mine tunnels.

In the case of a below ground mining vehicle, it is either desirable or required that the vehicle include particular features. As explained earlier, it is conventional wisdom in the industry that below ground mining vehicles must be designed and fabricated from the "ground up." Disadvantageously, this approach results in vehicles which are expensive to acquire and maintain.

In order to achieve its objective of providing below ground mining vehicles that are less expensive and more efficient than previously available vehicles, the present invention uses original vehicles having a vertical height which is low enough for operation in mine tunnels, e.g., less than seventy inches, which are produced for general street and highway use. In accordance with the present invention, such vehicles are modified to allow their use as a below ground mining vehicle.

The presently preferred embodiment of the present invention herein is carried out using one of the 1990 pick-up models available from Isuzu Motors, Ltd. or American Isuzu Motors Inc. The specified pickup models are examples of a class of vehicles which can be generally referred to as "light duty trucks" and the invention also may be used with vehicles classified as "general purpose" or "sport utility" vehicles. Another example of a vehicle fitting within these classes and which may be used with the present invention is the model "Rocky" sport utility vehicle available from Daihatsu Motor Company or Daihatsu America, Inc. Many other vehicles can also be used with the present invention. All of these vehicles will be referred to herein as an "original vehicle."

Since the below ground mining vehicles resulting from the present invention are intended to only be used in mining applications, substantial savings can be obtained if some government and industry mandated equipment required for use on streets and highways is omitted from the vehicles as they are being mass produced.

Provided in FIG. 12 is an exploded perspective view of another presently preferred embodiment of the present invention fabricated from the specified Isuzu pickup and which is particularly adapted for use as a general purpose below ground mining vehicle. The represented embodiment includes a vehicle body 300A, drive train components 300B, and a chassis 300C. Also generally represented in FIG. 12 are components which will be described in greater detail later in this disclosure. Such components are generally indicated in FIG. 12 and include: injection pump 302 (concealed in the engine); transmission 304; transfer case 306; fire suppression components 308; manual fuel shut off 310; battery box and circuit breaker 312; engine intake shut off 314; and, back-up alarm 316.

Figure 13A:
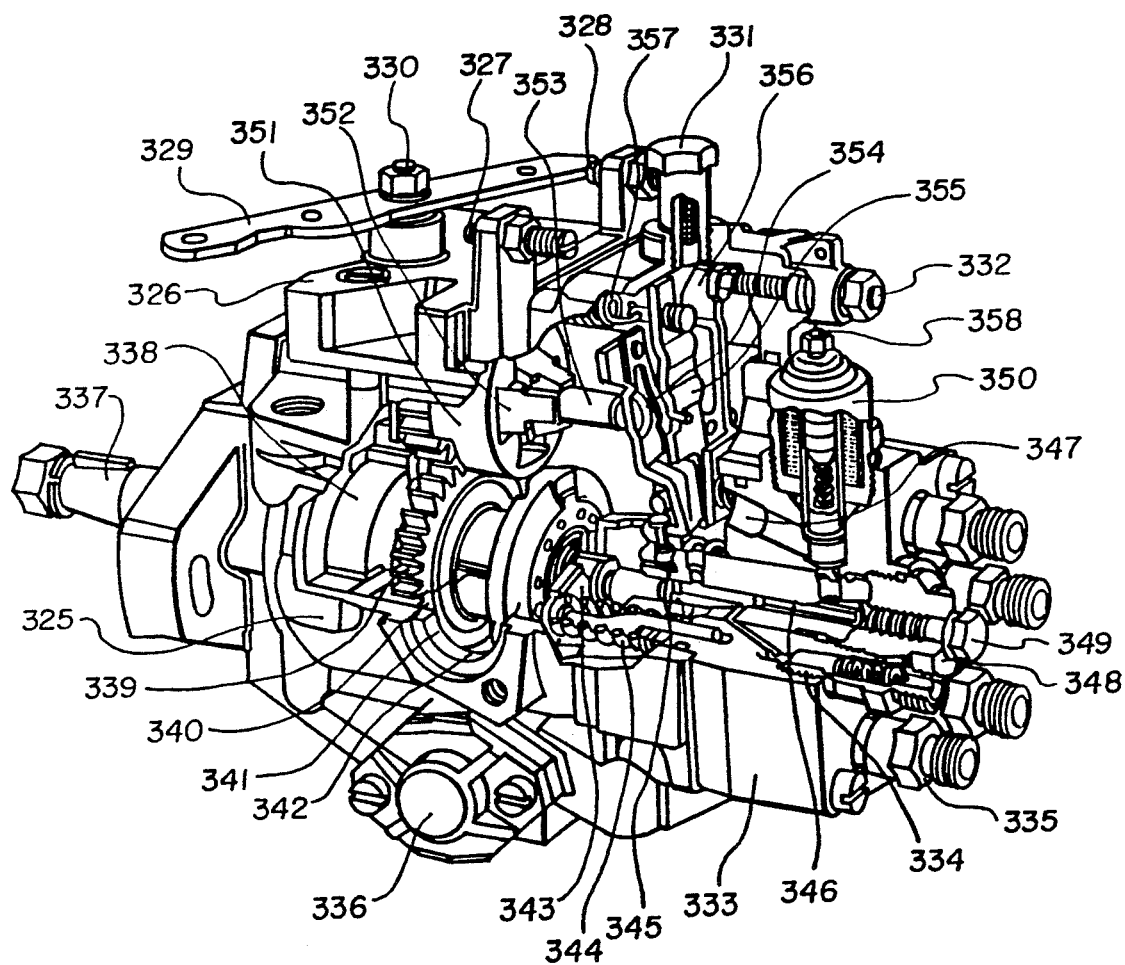
FIGS. 13A and 13B are schematic views of the fuel injection pump components of the described below ground mining vehicle.

Referring next to FIG. 13A, a partially cut away overall perspective view of the fuel injection pump components of the described below ground mining vehicle is provided. The represented fuel pump is one available under the trademark Diesel Kiki ® and which is included in the described Isuzu vehicle. Provided below in Table A is a list of the components represented in FIG. 13A with their corresponding reference numerals.

TABLE A

| Reference Numeral | Description |
| --- | --- |
| 325 | Pump Housing |
| 326 | Governor Cover |
| 327 | Rated-Speed Adjusting Screw |
| 328 | Idle-Speed Adjusting Screw |
| 329 | Control Lever |
| 330 | Control Lever Shaft |
| 331 | Overflow Restriction |
| 332 | Delivery Adjusting Screw |
| 333 | Hydraulic Head |
| 334 | Delivery-Valve Assembly |
| 335 | Delivery-Valve Holder |
| 336 | Timing Device |
| 337 | Driveshaft |
| 338 | Vane-Type Supply Pump |
| 339 | Governor Drive |
| 340 | Cam Roller Ring |
| 341 | Rollers of Cam Roller Ring |
| 342 | Cam Plate |
| 343 | Spring Link |
| 344 | Plunger Return Springs |
| 345 | Control Collar |
| 346 | Distributor Pump Plunger |
| 347 | Inlet Port |
| 348 | Screw Plug |
| 349 | Bleeder Screw |
| 350 | Electric Shutoff Device |

TABLE A-continued

| Reference Numeral | Description |
| --- | --- |
| 351 | Flyweight Assembly |
| 352 | Flyweights |
| 353 | Sliding Sleeve |
| 354 | Starting Lever |
| 355 | Tensioning Lever |
| 356 | Adjusting Lever |
| 357 | Governor Spring |
| 358 | Pivot for Adjusting Lever |

Figure 13B:
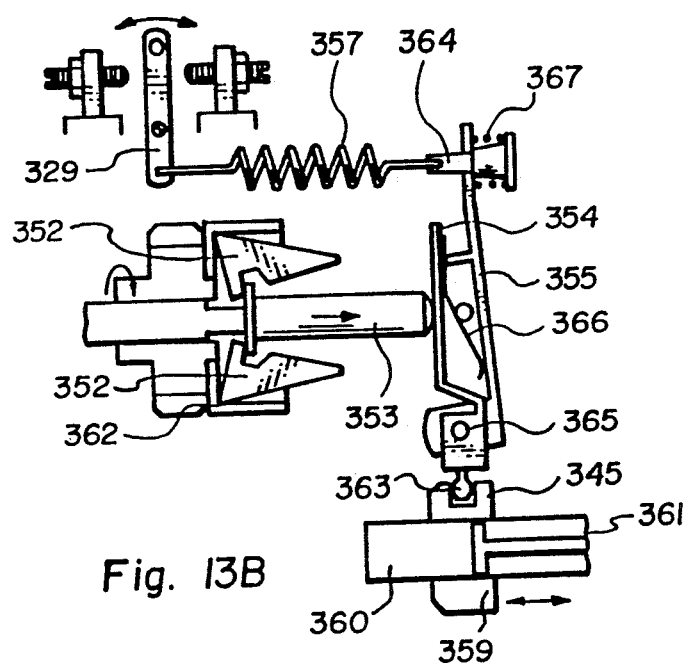

Represented in FIG. 13B is detailed view of the governor mechanism included in the preferred fuel injection pump. Provided below in Table B is a list of the components represented in FIG. 13B with their corresponding reference numerals.

TABLE B

| Reference Numeral | Description |
| --- | --- |
| 329 | Control Lever |
| 345 | Control Collar |
| 352 | Flyweights |
| 353 | Sliding Sleeve |
| 354 | Starting Lever |
| 355 | Tensioning Lever |
| 357 | Governor Spring |
| 359 | Endface of Control Collar |
| 360 | Distributor Pump Plunger |
| 361 | Spill Port of Distributor Pump Plunger |
| 362 | Knife-Edge Bearing |
| 363 | Ball Pin on Starting Lever |
| 364 | Retaining Pin |
| 365 | Pivot for starting lever and tensioning lever |
| 366 | Starting Spring |
| 367 | Idle Spring |

One of the features of the completed below ground mining vehicle of the present invention is that the maximum speed of the vehicle is limited to not greater than about 30 miles per hour and preferably not greater than about 25 miles per hour. Thus, in a below ground mining environment, even extreme operator error cannot cause a vehicle to go racing out of control. As will be appreciated by those skilled in the art, there are a variety of methods for limiting engine speed and, ultimately, vehicle speed. The modification of the injection pump included with the specified pickup is presently preferred and is just one example of a means for limiting the engine speed.

Generally, the modifications made to the original vehicle will reduce the maximum speed of the original vehicle (the speed of the vehicle in the highest forward speed at the maximum engine speed) is reduced by at least about half and preferably by two thirds. It will be appreciated that when dealing with diesel engines, the optimum engine speed falls within a relatively narrow range. Thus, the limitation on the engine speed should generally not be too drastic. The described reduction to 90% in the maximum engine speed is preferred and, depending upon the particular diesel engine, a higher or lower value might be used within the scope of the present invention.

Provided below in Procedure A is a list of the presently preferred steps which are to be carried out on the injection pump components in accordance with the present invention.

Procedure A

1. Remove upper injection pump governor housing.

2. Remove throttle control lever.
3. Remove full-load adjusting screw from governor housing.
4. Remove control lever shaft from governor housing.
5. Disconnect and remove the governor spring, pin, and the idle spring.
6. Install a 3500 RPM governor spring, pin, and idle spring in pump. (Available under the trademark Diesel Kiki ® part number 146513-0020).
7. Replace upper governor housing.
8. Replace throttle control lever.
9. Replace full-load adjusting screw.
10. Bench test and calibrate pump to manufacturers specifications.

In the described preferred embodiment, engine speed is limited by modifying the fuel injection pump. In order to limit the overall maximum speed of the vehicle, the transmission is modified.

Figure 14A:
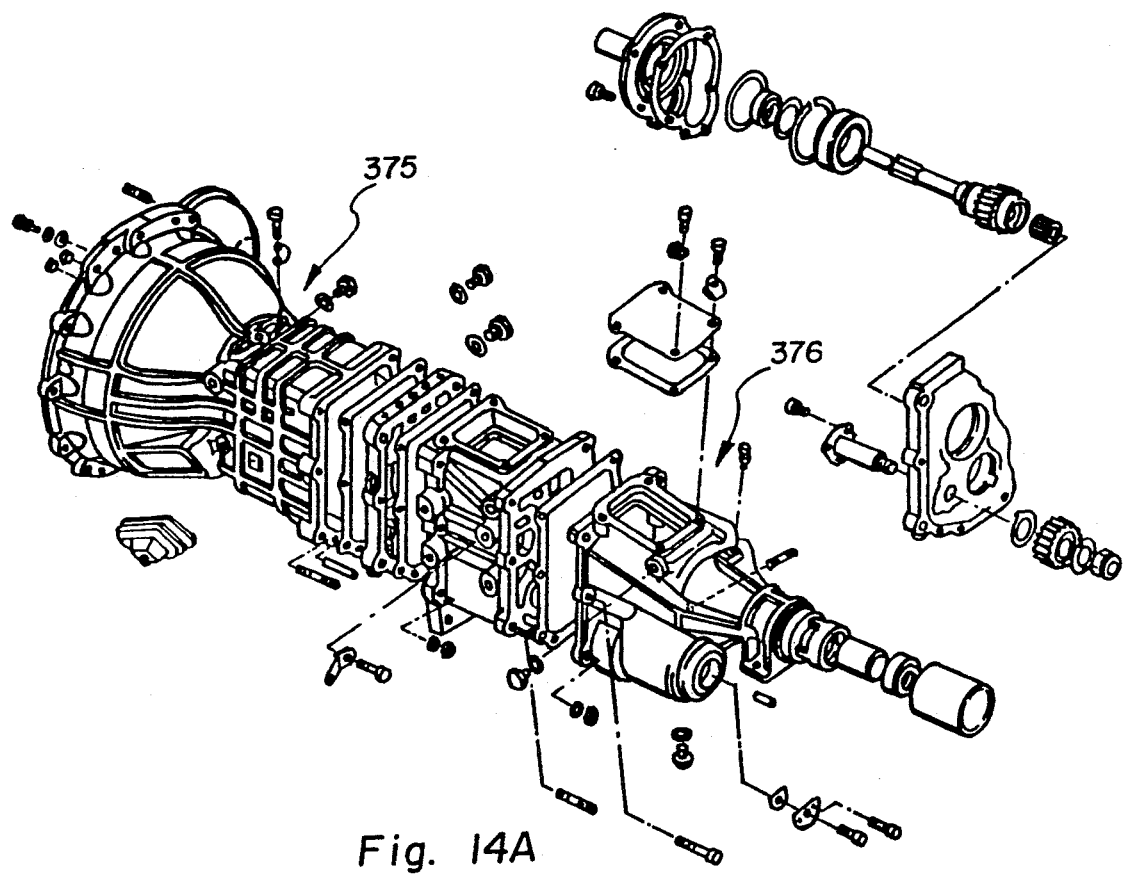
FIGS. 14A and 14B are representations of the transmission assembly components of the described below ground mining vehicle.

Provided in FIG. 14A is an exploded perspective view of the transmission represented generally in FIG. 12. The transmission includes a front transmission case 375 and a rear transmission case 376. The illustrated transmission is a five speed transmission (i.e., five forward gears). Other transmissions may only have three or four forward speeds while still other transmissions may have more. Regardless of the number of forward speeds, the transmission should be modified so that the maximum speed obtainable by the vehicle at the maximum engine speed does not exceed the desired maximum vehicle speed, preferably one third of the original maximum speed.

Figure 14B:
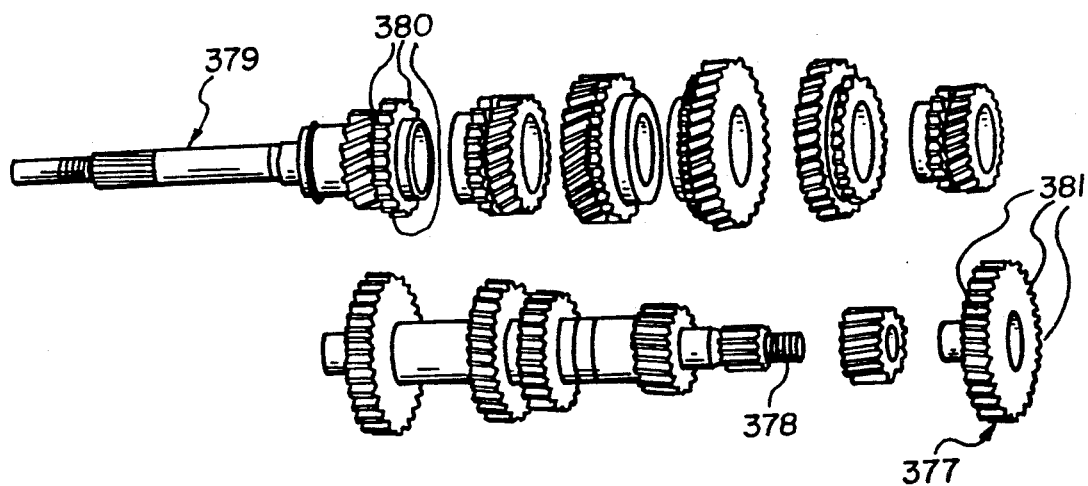

Provided below in Procedure B, and referencing FIG. 14B, is a list of the presently preferred steps which are to be carried out on the transmission components in accordance with the present invention.

Procedure B

1. Remove transmission front and rear case.
2. Remove 5th counter gear 377 from counter shaft 378.
3. Remove counter shaft 378 and input shaft 379.
4. Cut 4th gear teeth 380 off of input shaft 379.
5. Cut 5th gear teeth 381 off of 5th counter gear 377.
6. Replace modified input shaft 379.
7. Replace counter shaft 378.
8. Replace modified 5th counter gear 377.
9. Replace transmission front case and rear case.

In below ground mining vehicles, it is often preferred, but not required, that the vehicle include four wheel drive. Thus, the preferred described embodiment includes four wheel drive and the original vehicle is modified so that it is permanently in four wheel drive, low range, operation.

Figure 15:
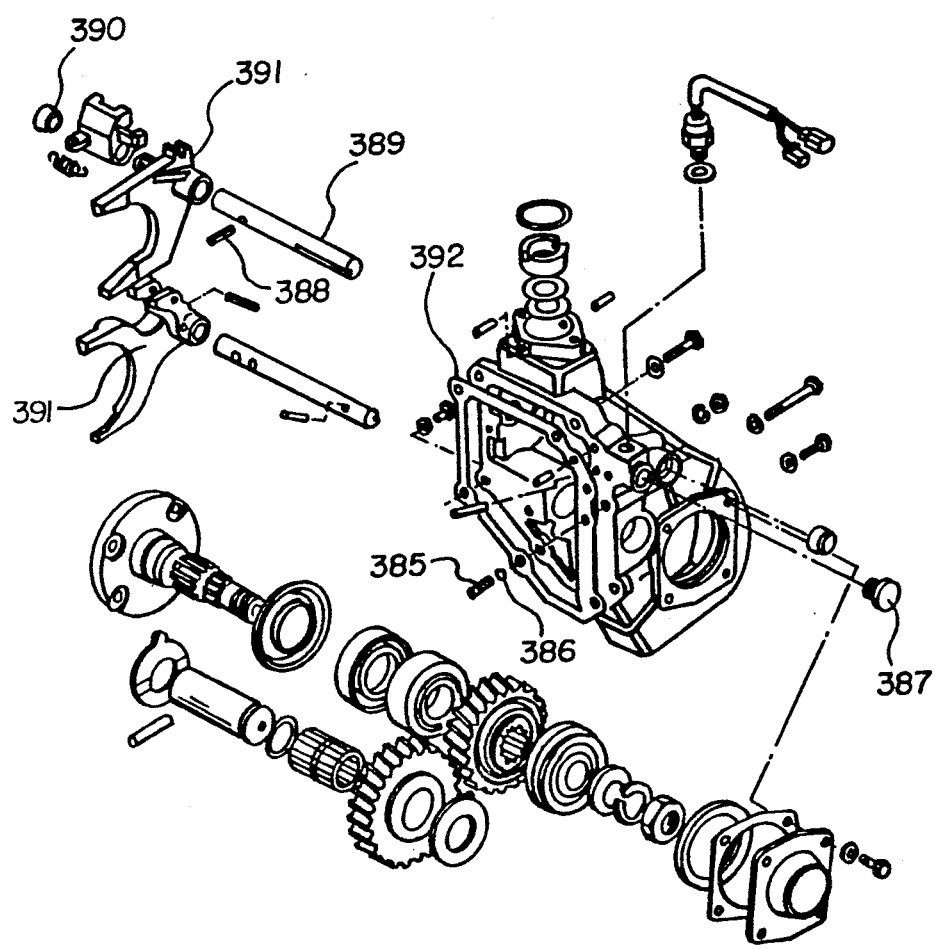
FIG. 15 is a representation of the transfer case components of the described below ground mining vehicle.

Represented in FIG. 15 is a transfer case which is included in the original vehicle. Set forth below in Procedure C, below, are the presently preferred steps for permanently locking the transfer case in the low range, four wheel drive position.

Procedure C

1. Remove transfer case from transmission.
2. Remove detent spring 385 and ball 386.
3. Remove plug 387.
4. Drive out pin 388 from shift rod 389.
5. Slide shift rod 389 until the front of the shift rod clears the case.
6. Fabricate and insert locking spacer 390 onto the end of the shift rod 389.
7. Slide shift rod 389 back into position.
8. Replace pin 388 in shift rod 389.
9. Replace plug 387 in the case.
10. Position forks 391 in four wheel drive low range position.
11. Position shifting sleeves in four wheel drive low range position.
12. Replace detent ball 386.
13. Fabricate and insert a locking rod (not represented in FIG. 15) in place of spring 385.
14. Replace gasket 392.
15. Remount transfer case.

Another feature which is desirably included in the preferred below ground mining vehicle of the present invention is an automatic engine intake shutoff valve and control. The engine intake shutoff valve and control functions to stop the engine if the temperature in the engine compartment exceeds a predetermined threshold and thus performs an important safety function.

Figure 16A:
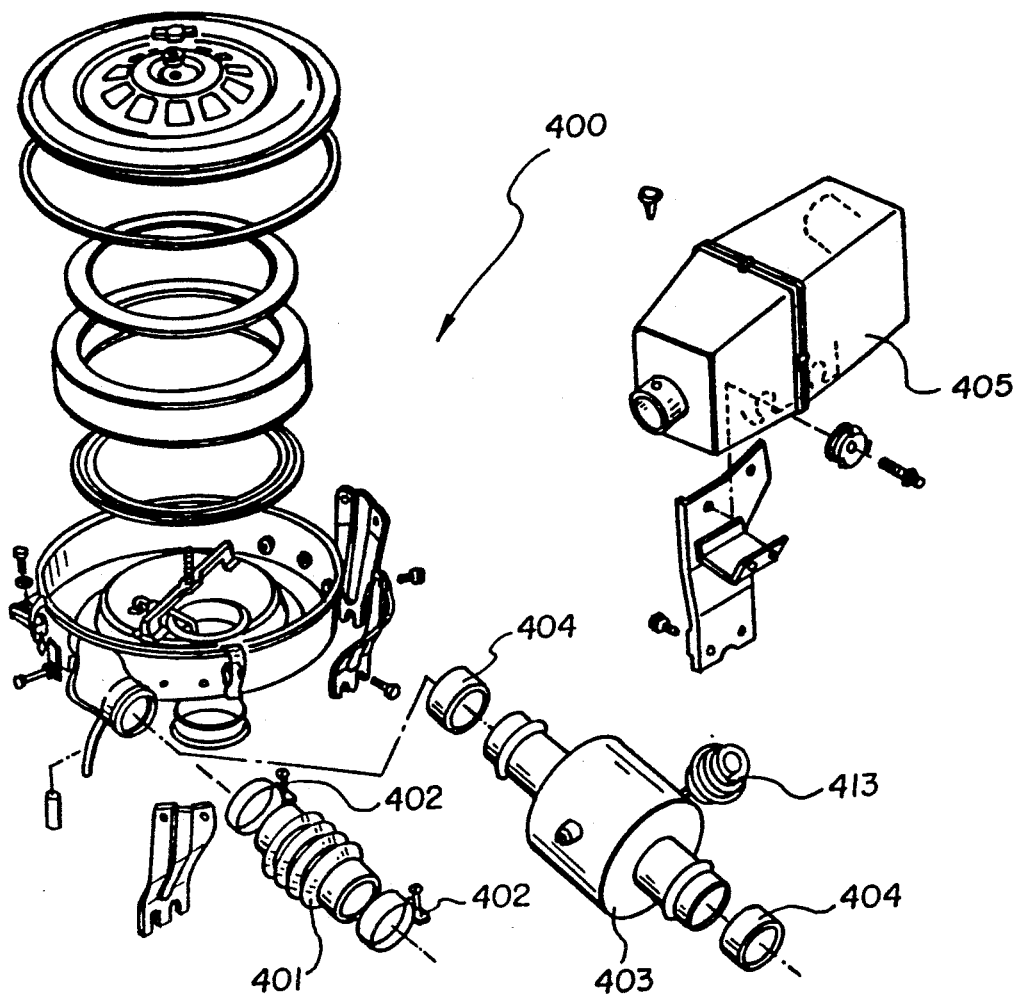
FIGS. 16A and 16B are representations of the air cleaner components and shutoff valve assembly of the described below ground mining vehicle.

Represented in FIG. 16A is the air cleaner, generally designated at 400, which is included in the original vehicle. The air cleaner 400 is modified in accordance with Procedure D provided, below.

Procedure D

1. Disconnect clamps 402 and remove flexible hose section 401.
2. Install shut off valve 403 in place of hose section 401.
3. Install hose section 404 using clamps between air cleaner 400 and shut off valve 403.
4. Install hose section 404 using clamps between air plenum 405 and shut off valve 403.
5. Secure hose clamps.

Figure 16B:
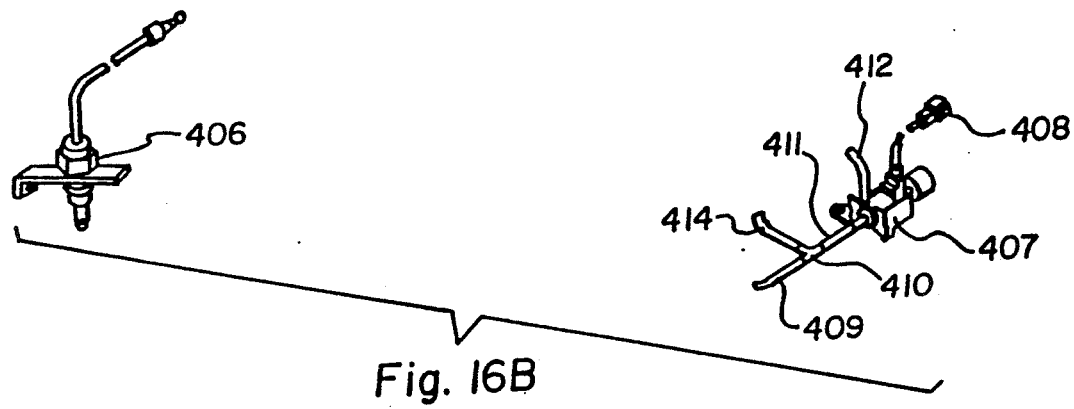

Referring next to FIG. 16B, the control components for the automatic engine intake shutoff valve, and its connection to the engine vacuum source, are represented. The installation of the control components in the original vehicle is carried out in accordance with Procedure E set forth below.

Procedure E

1. Install temperature sensor 406 on engine compartment firewall (not represented).
2. Mount vacuum valve 407 on the left front inner fender panel in the engine compartment (not represented).
3. Install wiring harness 408 between temperature sensor 406, fuse box in engine compartment (not represented), and vacuum valve 407.
4. Cut vacuum line 409 leading to vacuum pump on the alternator (not represented).
5. Install T fitting 410.
6. Install two ends of the vacuum pump line 409 to T fitting 410.
7. Install vacuum hose 411 between T fitting 410 and inlet of vacuum valve 407.
8. Install vacuum hose 412 between vacuum valve 407 and vacuum actuator 413 on shut off valve 403
9. Secure all hoses with tie wraps (not represented).

Figure 17A:
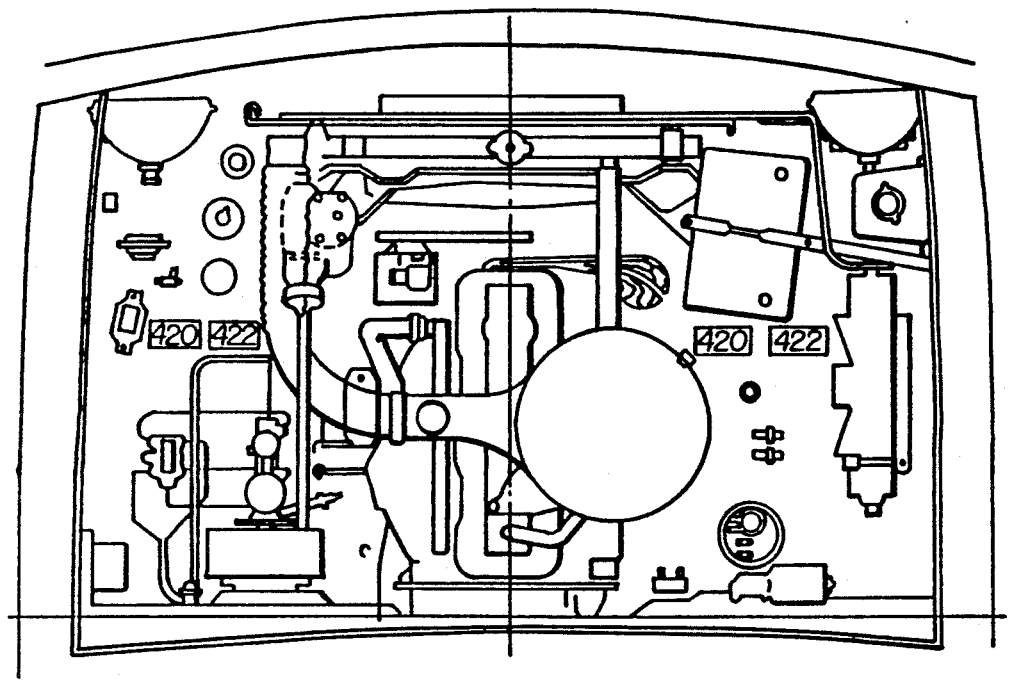
FIGS. 17A and 17B are representations of the automatic fire suppression components of the described below ground mining vehicle.
Figure 17B:
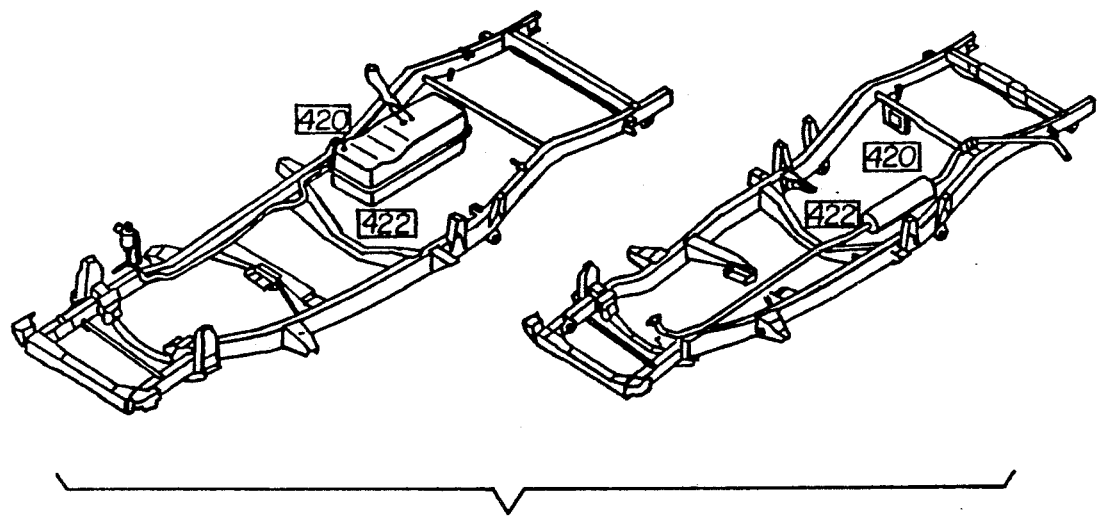

In order to maximize the safe operation of the below round mining vehicle of the present invention, a fire suppression system is installed on the original vehicle. The fire suppression system includes both fire sensors and extinguisher nozzles located in the engine compartment, at the fuel tank, and at the exhaust muffler. The preferred positions for installation of the fire sensors in the engine compartment of the original vehicle are indicated in FIG. 17A at 420 and the positions of the extinguisher nozzles are indicated at 422. The preferred positions for installation of the fire sensors in the original vehicle adjacent to the fuel tank and the exhaust muffler are indicated in FIG. 17B at 420 and the positions of the extinguisher nozzles are indicated at 422.

The chemical canisters, chemical lines, and the control components for the fire suppression system are not represented but those skilled in the art will understand the details of their installation. The chemical canisters and the control components can be conveniently mounted in the bed of the original vehicle. For example, one preferred fire suppression system which can be installed in the embodiments of the present invention is available from AFEX Fire Suppression Systems of Raleigh, N.C.

Figure 18:
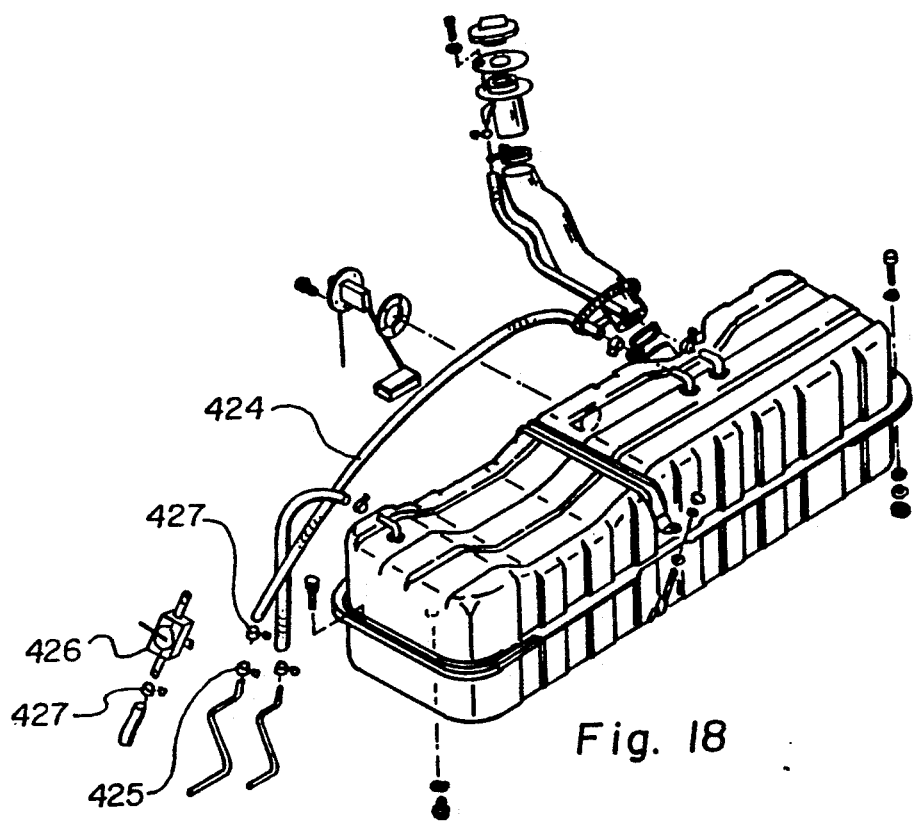
FIG. 18 is a representation of the manual fuel shut off components of the described below ground mining vehicle.

The below ground mining vehicle of the present invention, and the method of converting the original vehicle to the same, includes a manual fuel shut off valve which, when closed, ensures that fuel does not travel from the fuel tank to the engine. FIG. 18 provides an exploded perspective view of the manual fuel shut off components installed in the original vehicle. Procedure F, set forth below, provides the presently preferred steps for installing the manual fuel shut off valve.

Procedure F

1. Disconnect the fuel line 424 at the position indicated at 425.
2. Cut 6 inches off the end of fuel line 424.
3. Install manual shut off valve 426 in fuel line using clamps 427.
4. Mount manual shut off valve 426 and fuel line on the right hand frame member (not represented in FIG. 18).

Figure 19:
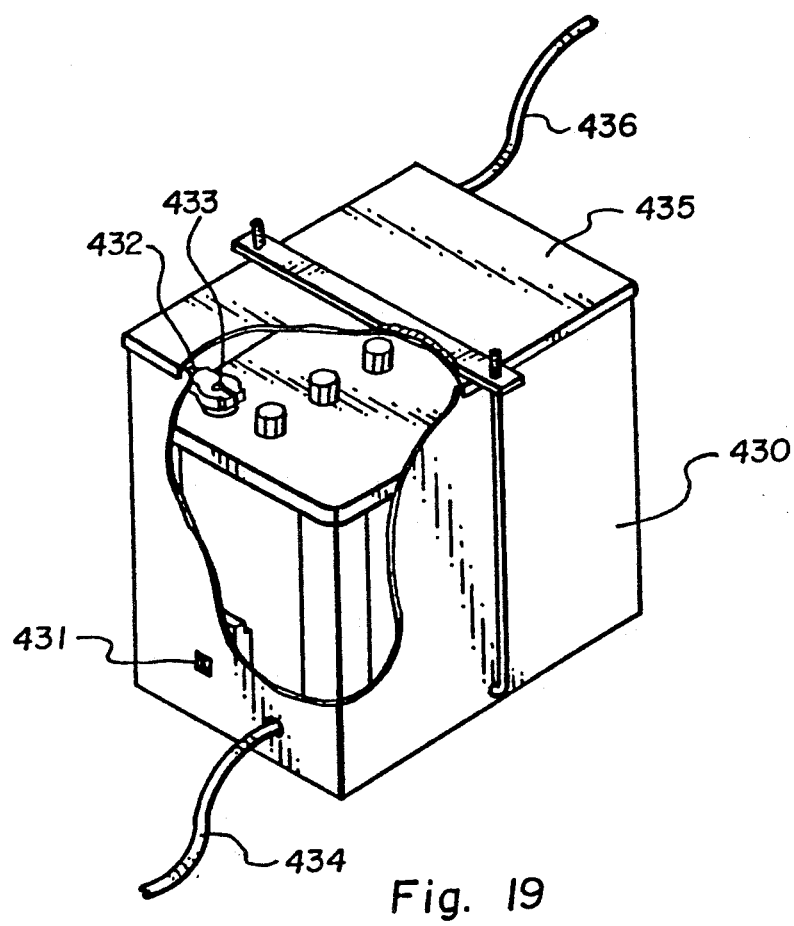
FIG. 19 is a representation of the battery components of the described below ground mining vehicle.

Still another feature which is desirably included in the preferred below ground mining vehicle of the present invention is a battery box which encloses the original vehicle battery and a circuit breaker integral with the battery box. FIG. 19 provides a representation of a battery box 430 which encloses the battery and is fabricated from a durable material. A circuit breaker 431, which is preferably a 12 volt, 100 amp circuit breaker, is provided integrally with the battery box and provides additional protection against fires in the vehicle. The presently preferred steps for installing the battery box 430 in the original vehicle are set forth below in Procedure G.

Procedure G

1. Remove battery from the original vehicle.
2. Install battery box 430 with integral circuit breaker 431 in position within the engine compartment.
3. Re-install battery cable 432 between battery positive post 433 and circuit breaker 431. Cable openings in the battery box should be provided with grommets (not represented).
4. Install battery cable 434 between circuit breaker 431 and starter post (not represented in FIG. 19).
5. Install negative cable 436 and battery box lid 435 and secure all wiring.

Figure 20:
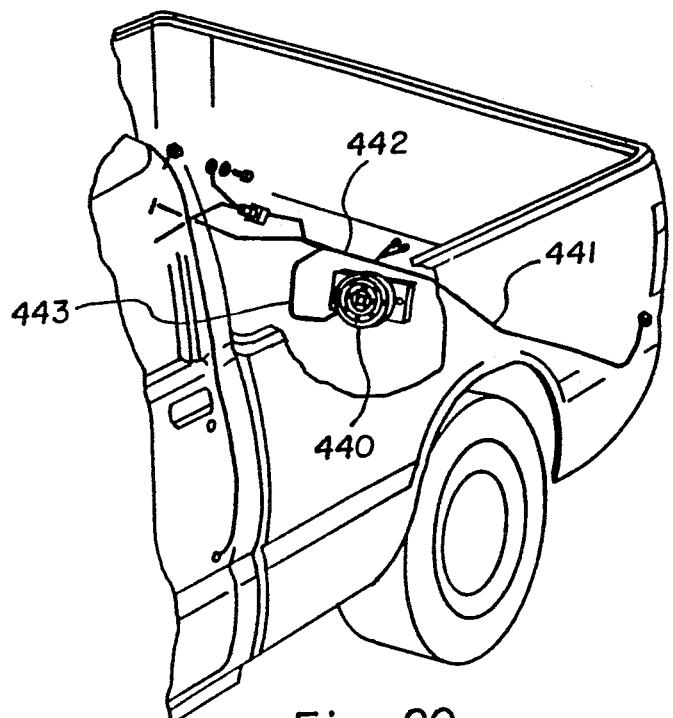
FIG. 20 is a representation of the back up alarm installed in the described below ground mining vehicle.

Referring next to FIG. 20, the below ground mining vehicle of the present invention also includes a back up alarm which automatically sounds an audible alarm when the vehicle's transmission is placed into reverse. The presently preferred steps for installing the back up alarm in the original vehicle are set forth in Procedure H, below.

Procedure H

1. Mount the back up alarm 440 to underside of original vehicle bed.
2. Connect back up alarm wiring 443 to reverse lamp circuit 441 at the point indicated at 442.
3. Secure all wiring with wire ties (not represented).

Figure 21:
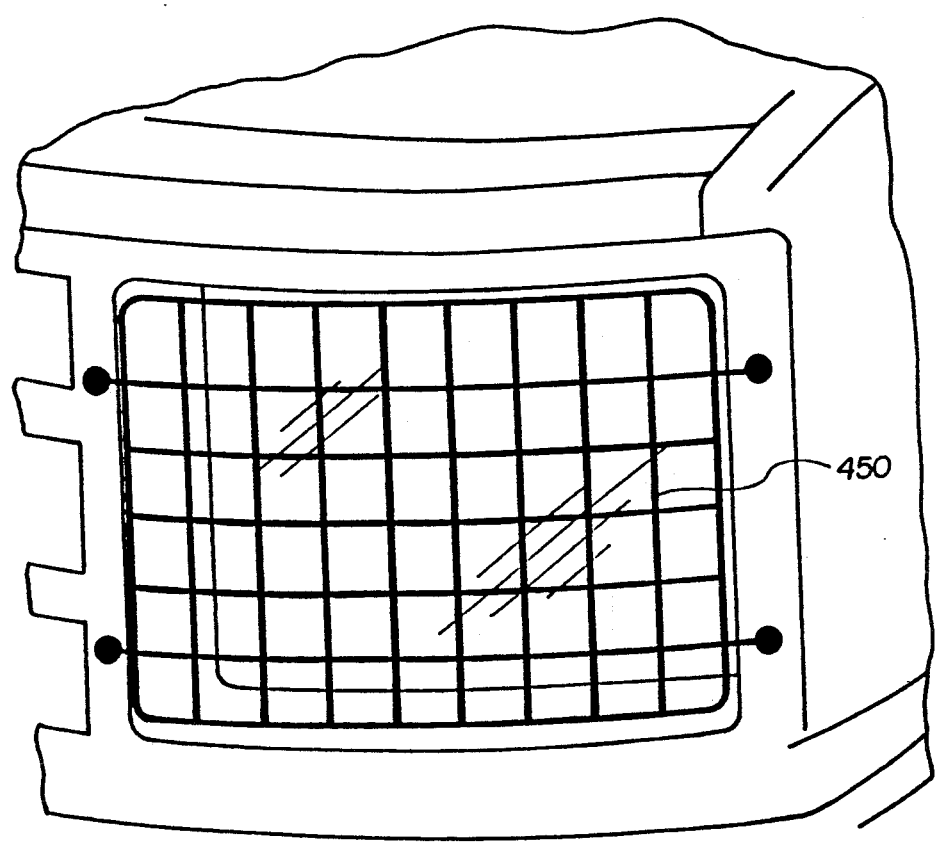
FIG. 21 is a representation of the headlamp guard components included in the described below ground mining vehicle.

Referring next to FIG. 21, in order to avoid damage to the headlamps of the vehicle in the inhospitable below ground mine environment, headlamp guards 450, as are available in the art, are installed over both headlamps (with only one being represented in FIG. 21).

It will be appreciated that a variety of components, other than those specified above, are available in the art which can be used in accordance with the present invention. Those skilled in the art will readily be able to identify alternative components for use in carrying out the present invention and determine which components are best suited for particular applications. For example, the parts and/or service manuals for the Isuzu pick up models and the Daihatsu Rocky model will provide additional information to those skilled in the art and are now incorporated herein by reference.

4. Conclusion

In view of the foregoing, it will be appreciated that the present invention is a great advance in the arts pertaining to below ground mining vehicles. The present invention allows the desirable components and features of an above ground vehicle to be incorporated into a below ground mining vehicle more economically than possible with prior art below ground mining vehicles. Moreover, the embodiments of the present invention perform better in many applications than prior art below ground mining vehicles because the components incorporated therein have been designed to work together rather than being a collection of unrelated components as are incorporated into prior art below ground mining vehicles.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of converting an above ground vehicle to a below ground mining vehicle, the above ground vehicle comprising a diesel engine, a pair of front wheels used to steer the vehicle, a pair of rear driving wheels, and a transmission having a plurality of forward speeds connected between the engine and the pair of rear driving wheels, the method comprising the steps of:

disconnecting a portion of the drive train between the engine and rear wheels;

disassembling the transmission;

modifying the transmission to disable at least one of the highest forward gears so that the maximum speed attainable by the vehicle is no greater than 50 percent of the original maximum speed; and reassembling the transmission and reconnecting the engine and the rear wheels so that the vehicle can propel itself.

2. A method of converting an above ground vehicle to a below ground mining vehicle as defined in claim 1 wherein the drive train comprises a transmission and wherein the step of disconnecting a portion of the drive train comprises the steps of:
removing the transmission; and
disabling at least the highest forward speed of the transmission.

3. A method of converting an above ground vehicle to a below ground mining vehicle as defined in claim 2 wherein the above ground vehicle further comprises a four wheel drive transfer case having both a high and a low range, wherein the step of disconnecting a portion of the drive train comprises the step of modifying the transfer case such that the transfer case is permanently set in its four wheel drive, low range, position.

4. A method of converting an above ground vehicle to a below ground mining vehicle as defined in claim 1 wherein the above ground vehicle further comprises a fuel injection pump and wherein the method further comprises the step of modifying the fuel injection pump to limit the maximum speed of the engine to not greater than about 90 percent of the previous maximum speed of the engine.

5. A method of converting an above ground vehicle to a below mining vehicle as defined in claim 1 wherein the above ground vehicle further comprises a fuel injection pump and wherein the method further comprises the step of modifying the fuel injection pump to limit the maximum speed of the engine to not greater than about 3500 r.p.m.

6. A method of converting an above ground vehicle to a below ground mining vehicle as defined in claim 1 wherein the step of modifying the drive train comprises the step of modifying drive train so that the maximum speed of the vehicle is about 25 miles per hour.

7. A method of converting an above ground vehicle to a below ground mining vehicle as defined in claim 1 wherein the above ground vehicle comprises an air cleaner, a fuel tank and a fuel line, and a battery, and wherein the method comprises the steps of:
installing at least one fire suppression nozzle and at least one fire sensor in the engine compartment of the vehicle;
installing a manual fuel shut off valve in the fuel line; and
connecting an engine intake air shutoff valve to the engine cleaner and installing a temperature sensor in the engine compartment, the engine intake air shutoff valve being actuated when the temperature sensor detects a temperature above a threshold temperature.

8. A method of converting an above ground vehicle to a below ground mining vehicle as defined in claim 7 further comprising the step of installing a back up alarm.

9. A method of converting an above ground vehicle capable of highway speeds to a below ground mining vehicle, the above ground vehicle comprising a drive train having a diesel engine and a transmission, the method comprising the steps of:
modifying the engine to limit engine speed to not greater than about 90% of the original maximum engine speed; and
modifying the transmission so that at least one the highest forward speed is disabled.

10. A method of converting an above ground vehicle capable of highway speeds to a below ground mining vehicle as defined in claim 9 wherein the above ground vehicle comprises an engine including a fuel injection pump and wherein the step of modifying the engine to limit engine speed comprises the step of modifying the fuel injection pump to limit the maximum engine speed to about 3500 rpm.

11. A method of converting an above ground vehicle capable of highway speeds to a below ground mining vehicle as defined in claim 10 wherein the step of limiting the engine speed to about 3500 rpm comprises the step of replacing the governor spring located in the fuel injection pump.

12. A method of converting an above ground vehicle capable of highway speeds to a below ground mining vehicle as defined in claim 9 wherein the transmission comprises five forward speeds and wherein the step of modifying the transmission comprises the step of disabling the fourth and fifth forward speeds of the transmission.

13. A method of converting an above ground vehicle capable of highway speeds to a below ground mining vehicle as defined in claim 9 wherein the above ground vehicle comprises a diesel engine including an air cleaner, a fuel tank, and a fuel line connecting the fuel tank and the fuel line, wherein the method further comprises the steps of:
installing at least one fire suppression nozzle and at least one fire sensor in the engine compartment of the vehicle;
installing a manual fuel shut off valve in the fuel line; and
installing an engine intake air shutoff valve and a temperature sensor in the engine compartment, the engine intake air shutoff valve being actuated when the temperature sensor detects a temperature above a threshold temperature.

14. A method of converting an above ground vehicle capable of highway speeds to a below ground mining vehicle as defined in claim 13 wherein the above ground vehicle comprises a battery connected to the engine and a starter motor and the method further comprises the steps of:
installing an enclosed box in the vehicle and placing the battery in the enclosed box; and
installing a circuit breaker in the connection between the battery and the starter motor.

15. A method of converting an above ground vehicle capable of highway speeds to a below ground mining vehicle as defined in claim 14 wherein the above ground vehicle transmission comprises a reverse speed and wherein the method further comprises the step of installing an audible back up alarm, the back up alarm sounding whenever the transmission is placed in the reverse speed.

16. A method of converting an above ground vehicle capable of highway speeds to a below ground mining vehicle as defined in claim 15 wherein the above ground vehicle further comprises a pair of headlamps and wherein the method further comprises the step of installing a headlamp guard over each of the headlamps.

17. A method of converting an above ground vehicle comprising a diesel engine including an fuel injection pump with a governor, a fuel tank and a fuel line connecting the fuel tank and the fuel line, and a transmission having at least four forward speeds, to a below ground mining vehicle, the method comprising the steps of:
- modifying the injection pump governor to limit engine speed to not more than about 3500 r.p.m.;
- modifying the transmission to eliminate the fourth and any higher forward speeds;
- installing at least one fire suppression nozzle and at least one fire sensor in the engine compartment of the vehicle;
- installing a manual fuel shut off valve in the fuel line; and
- installing an engine air intake shutoff valve and a temperature sensor in the engine compartment, the engine air intake shutoff valve being actuated when the temperature detects a temperature above a threshold temperature.

18. A method of converting an above ground vehicle into a below ground mining vehicle as defined in claim 17 wherein the step of modifying the transmission comprises the step of modifying the transmission so that the maximum vehicle speed is not greater than about 25 miles per hour.

19. A method of converting an above ground vehicle into a below ground mining vehicle as defined in claim 17 wherein the above ground vehicle comprises a battery connected to the engine and a starter motor and the method further comprises the steps of:
- installing an enclosed box in the vehicle and placing the battery in the enclosed box; and
- installing a circuit breaker in the connection between the battery and the starter motor.

20. A method of converting an above ground vehicle into a below ground mining vehicle as defined in claim 17 wherein the above ground vehicle transmission comprises a reverse speed and wherein the method further comprises installing an audible back up alarm, the back up alarm sounding whenever the transmission is placed in the reverse speed.

21. A method of converting an above ground vehicle into a below ground mining vehicle as defined in claim 17 wherein the above ground vehicle comprises a pair of headlamps and wherein the method further comprises the step of installing a headlamp guard over each of the headlamps.

22. A method of converting an above ground vehicle into a below ground mining vehicle as defined in claim 17 wherein the above ground vehicle comprises means for selectively conveying power to a pair of rear wheels only and to a pair of front steering wheels and the rear driving wheels and wherein the method further comprises the step of modifying the means for selectively conveying power so that power is permanently applied to the rear driving wheels and to the front steering wheels.

23. A below ground mining vehicle comprising:
- a chassis;
- a body mounted on the chassis, the body including an operator's compartment;
- a diesel engine, the engine including means for limiting the maximum engine speed to not greater than about 3500 r.p.m.;
- a first pair of wheels, the first pair of wheels used for steering the vehicle;
- a second pair of wheels, the second pair of wheels being always driven by the engine;
- a transmission, the transmission comprising a highest forward speed which propels the below ground mining vehicle at no more than about 25 miles per hour when the engine is operating at its maximum speed.

24. A below ground mining vehicle as defined in claim 23 wherein the a transmission comprises at least one reverse speed and no more than first, second, and third operable forward speeds.

25. A below ground mining vehicle as defined in claim 23 further comprising fire suppression means in the vicinity of the engine.

26. A below ground mining vehicle as defined in claim 23 further comprising:
- a fuel tank;
- a fuel line connecting the fuel tank to the engine; and
- a manual fuel shut off valve in the fuel line.

27. A below ground mining vehicle as defined in claim 23 further comprising an engine intake shut off valve and a temperature sensor positioned adjacent to the engine, the engine intake shut off valve closing in response to the temperature sensor detecting an abnormal temperature.

28. A below ground mining vehicle as defined in claim 23 further comprising:
- a battery box enclosing a battery having a positive terminal; and
- a circuit breaker serially connected with the positive terminal.

29. A below ground mining vehicle as defined in claim 23 further comprising:
- fire suppression means in the vicinity of the fuel tank;
- an exhaust muffler; and
- a fire suppression means in the vicinity of the exhaust muffler.

30. A below ground mining vehicle as defined in claim 23 further comprising a back up alarm.

31. A below ground mining vehicle comprising:
- a chassis;
- a pair of front wheels;
- a pair of rear wheels;
- a diesel engine comprising means for limiting engine speed to about 3500 r.p.m. or less;
- a transmission, the transmission conveying power from the diesel engine to at least the pair of rear wheels, the transmission having at least one reverse gear and no more than first, second, and third operable forward gears;
- fire suppression means in the vicinity of the engine;
- a fuel tank;
- a fuel line connecting the fuel tank to the engine;
- a manual fuel shut off valve in the fuel line; and
- an engine intake shut off valve and a temperature sensor positioned adjacent to the engine, the engine intake shut off valve closing in response to the temperature sensor detecting an abnormal temperature.

32. A below ground mining vehicle as defined in claim 31 further comprising:
- a battery box enclosing a battery having a positive terminal;
- a circuit breaker serially connected with the positive terminal;
- fire suppression means in the vicinity of the fuel tank;
- an exhaust muffler;
- a fire suppression means in the vicinity of the exhaust muffler; and
- a back up alarm.

33. A method of converting an above ground vehicle to a below ground mining vehicle, the above ground vehicle comprising a pair of front steering wheels, a diesel engine having a fuel injection pump, and a pair of rear driving wheels, the method comprising the steps of:

disconnecting a portion of the drive train between the engine and rear wheels;

modifying the drive trains so that the maximum speed attainable by the vehicle is no greater than 50 percent of the original maximum speed;

reconnecting the portion of the drive train between the engine and the rear wheels including the modified drive train; and modifying the fuel injection pump to limit the maximum speed of the engine to not greater than about 90 percent of the previous maximum speed of the engine.

34. A method of converting an above ground vehicle to a below ground mining vehicle, the above ground vehicle comprising a pair of front steering wheels, a diesel engine having a fuel injection pump, and a pair of rear driving wheels, the method comprising the steps of:

disconnecting a portion of the drive train between the engine and rear wheels;

modifying the drive train so that the maximum speed attainable by the vehicle is no greater than 50 percent of the original maximum speed;

reconnecting the portion of the drive train between the engine and the rear wheels including the modified drive train; and modifying the fuel injection pump to limit the maximum speed of the engine to not greater than about 3500 r.p.m.

35. A below ground mining vehicle comprising:

a chassis;

a body mounted on the chassis, the body including an operator's compartment;

a diesel engine, the engine including means for limiting the maximum engine speed to not greater than about 3500 r.p.m.;

a first pair of wheels, the first pair of wheels used for steering the vehicle;

a second pair of wheels, the second pair of wheels being always driven by the engine;

a transmission, the transmission comprising a highest forward speed which propels the below ground mining vehicle at no more than about 25 miles per hour when the engine is operating at its maximum speed;

a temperature sensor positioned adjacent to the engine;

an engine intake shut off valve, the engine intake shut off valve closing in response to the temperature sensor detecting an abnormal temperature.

* * * * *